(12) United States Patent
Nakaya et al.

(10) Patent No.: US 7,212,327 B2
(45) Date of Patent: May 1, 2007

(54) IMAGING HEAD, IMAGING DEVICE AND IMAGING METHOD

(75) Inventors: Daisuke Nakaya, Kanagawa (JP); Takao Ozaki, Kanagawa (JP); Hiromi Ishikawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/260,261

(22) Filed: Oct. 28, 2005

(65) Prior Publication Data
US 2006/0055998 A1   Mar. 16, 2006

Related U.S. Application Data

(62) Division of application No. 10/724,621, filed on Dec. 2, 2003, now Pat. No. 6,980,348.

(30) Foreign Application Priority Data
Dec. 2, 2002   (JP)   ............................ 2002-349961

(51) Int. Cl.
   *G02B 26/00*   (2006.01)
(52) U.S. Cl. ........................ 359/290; 359/291; 359/237
(58) Field of Classification Search ................. 359/290
   See application file for complete search history.

(56) References Cited

U.S. PATENT DOCUMENTS

| 6,025,586 | A | 2/2000 | Sakaue et al. | 359/742 |
| 6,189,991 | B1 | 2/2001 | Wen et al. | 347/12 |
| 6,312,134 | B1 | 11/2001 | Jain et al. | 359/855 |
| 6,816,634 | B2 | 11/2004 | Hirawa | 382/505 |
| 6,951,666 | B2* | 10/2005 | Kodas et al. | 427/376.6 |
| 6,980,348 | B2* | 12/2005 | Nakaya et al. | 359/290 |
| 2002/0140801 | A1 | 10/2002 | Kubota | 347/239 |
| 2002/0196377 | A1 | 12/2002 | Furukawa et al. | 348/742 |

FOREIGN PATENT DOCUMENTS

| CN | 1207628 A | 2/1999 |
| EP | 1 211 882 A2 | 6/2002 |

OTHER PUBLICATIONS

Chinese Office Action for Application No. 200310116949.X dated Jun. 19, 2005.

* cited by examiner

*Primary Examiner*—Jordan Schwartz
*Assistant Examiner*—Jessica Stultz
(74) *Attorney, Agent, or Firm*—Sughrue Mion, PLLC

(57) ABSTRACT

An imaging head faces an imaging surface and is relatively moved along the scanning surface in a predetermined scanning direction. The imaging head includes an imaging element group and an alteration section. The imaging element group is structured by a plurality of imaging elements, which are arranged two-dimensionally in a plane substantially parallel to the imaging surface. The imaging element group generates a group of image pixels at the imaging surface in a two-dimensional arrangement which is inclined, as a whole, at a predetermined inclination angle with respect to the scanning direction. The alteration section alters a number of image pixels in a direction which is inclined from the scanning direction by the inclination angle, on the basis of a difference between the predetermined inclination angle of the imaging element group and an actual inclination angle of the image pixel group.

26 Claims, 18 Drawing Sheets

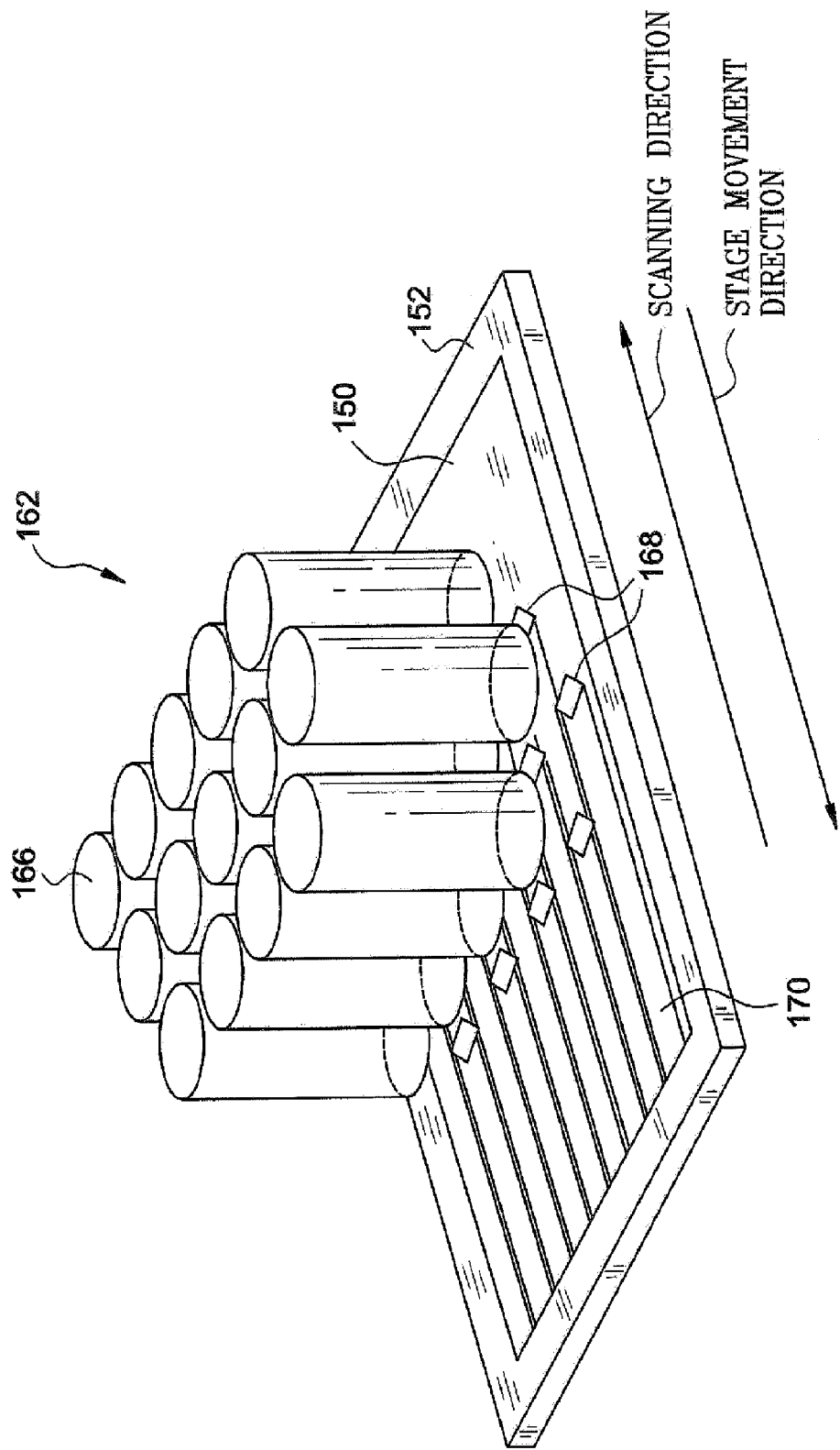

EXPOSED REGION

SUB-SCANNING DIRECTION
ONE CYCLE OF FIXED LOW SPEED SCANNING (40 mm/s)

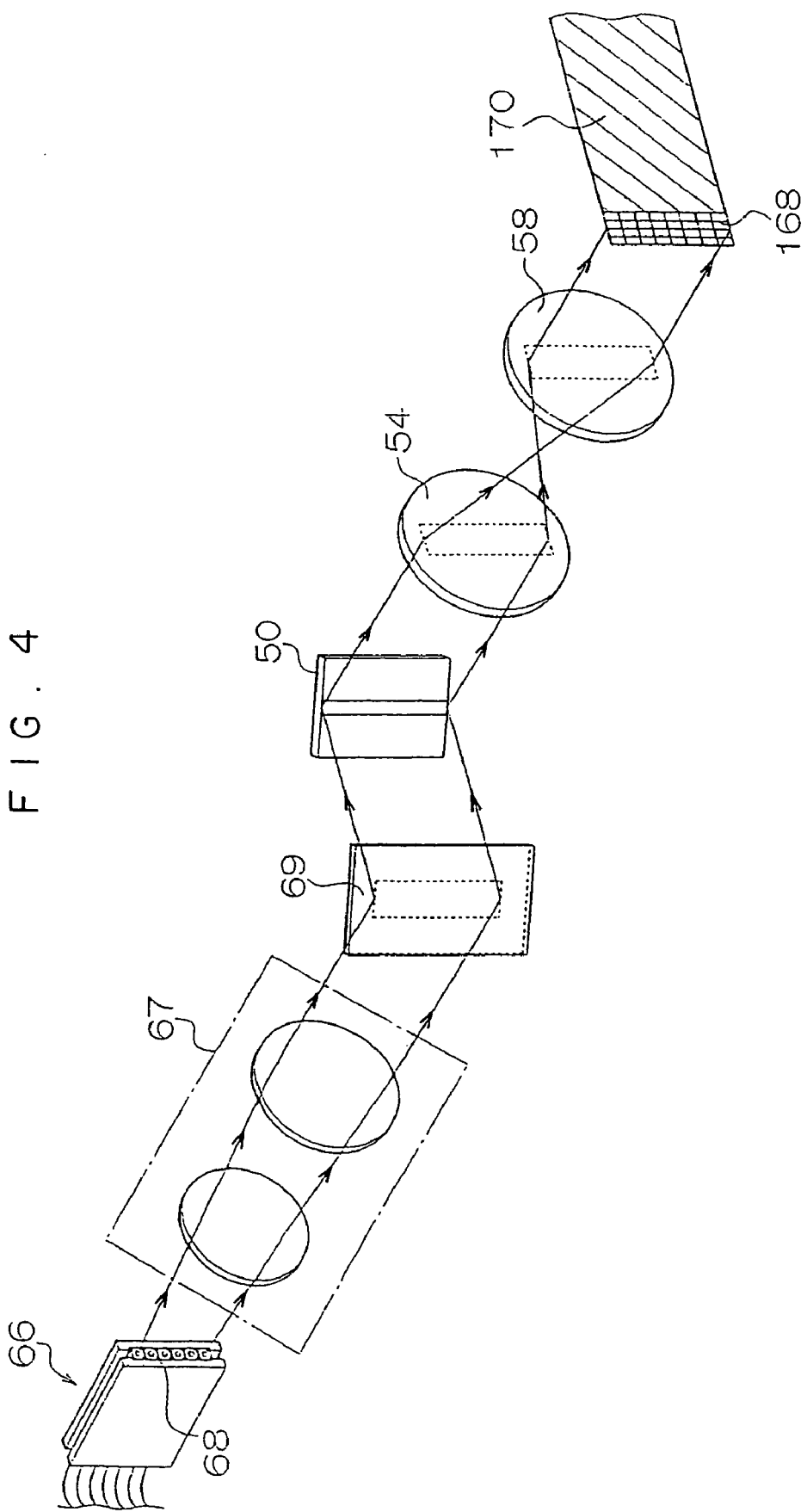

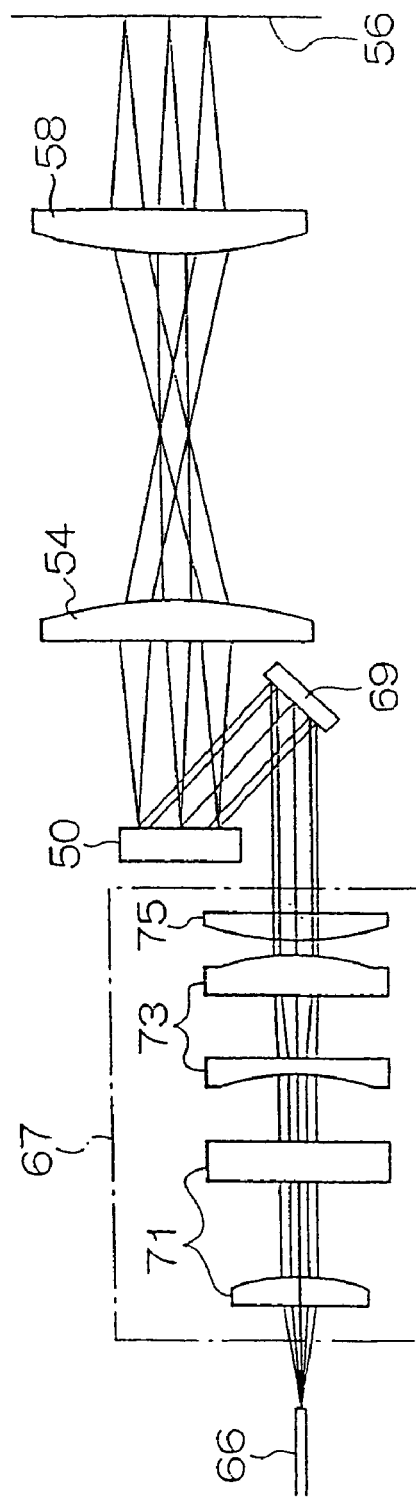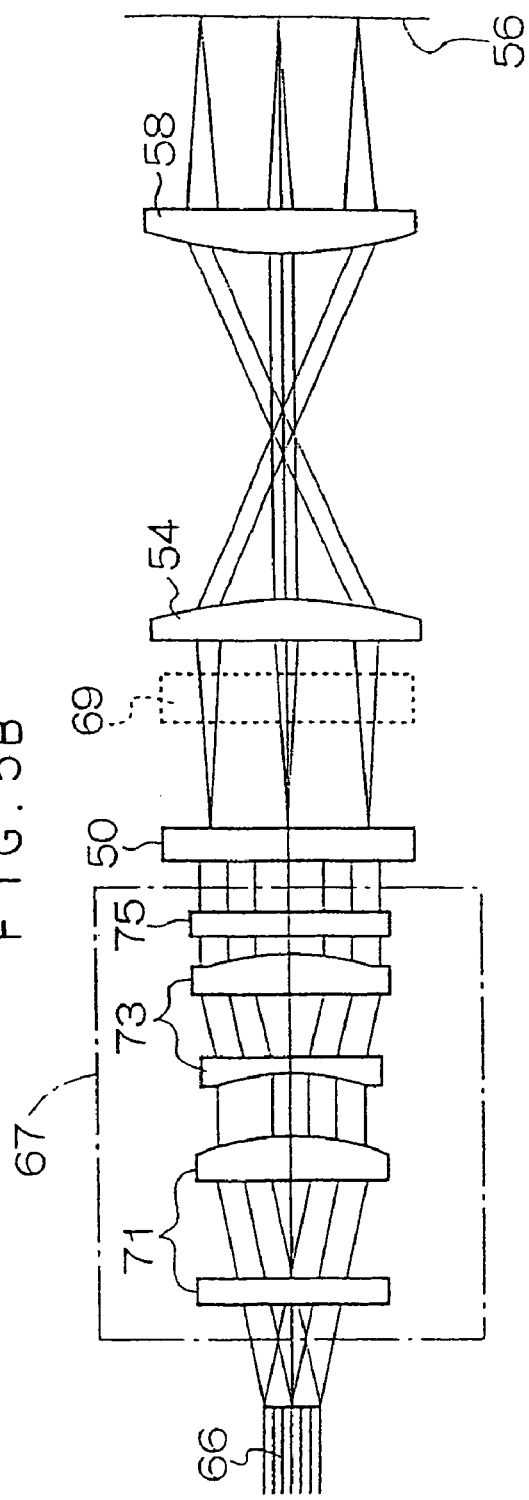

F I G . 6
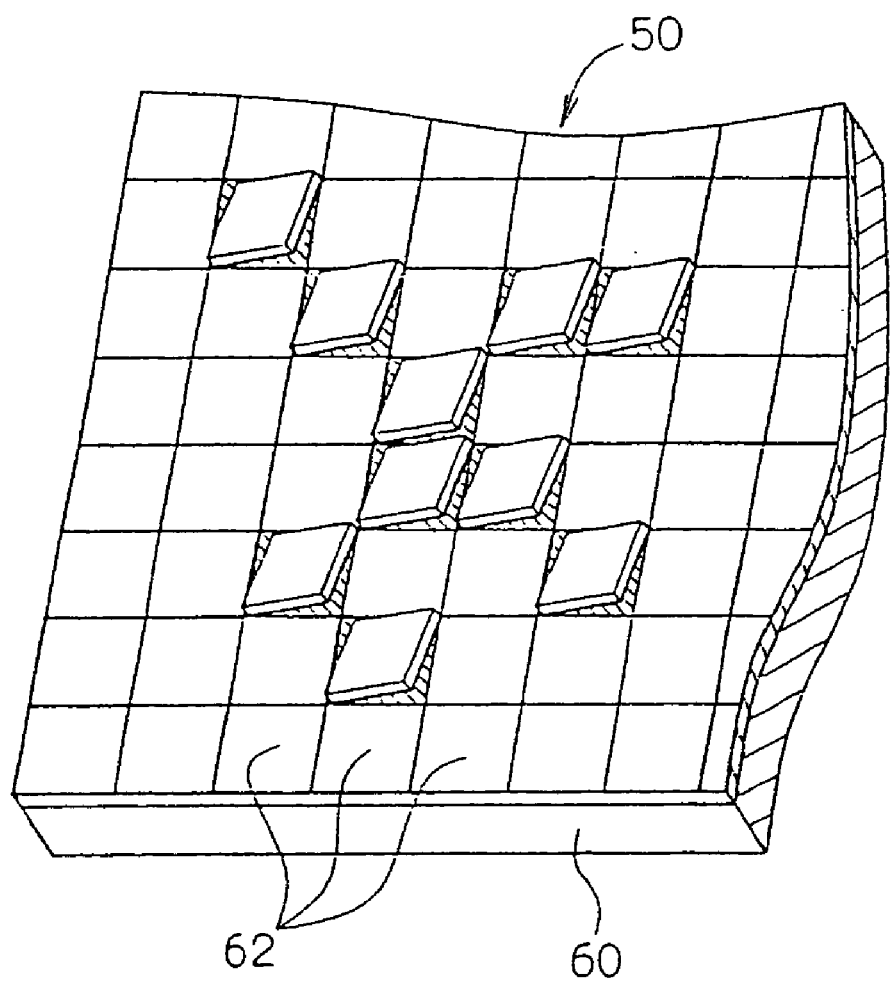

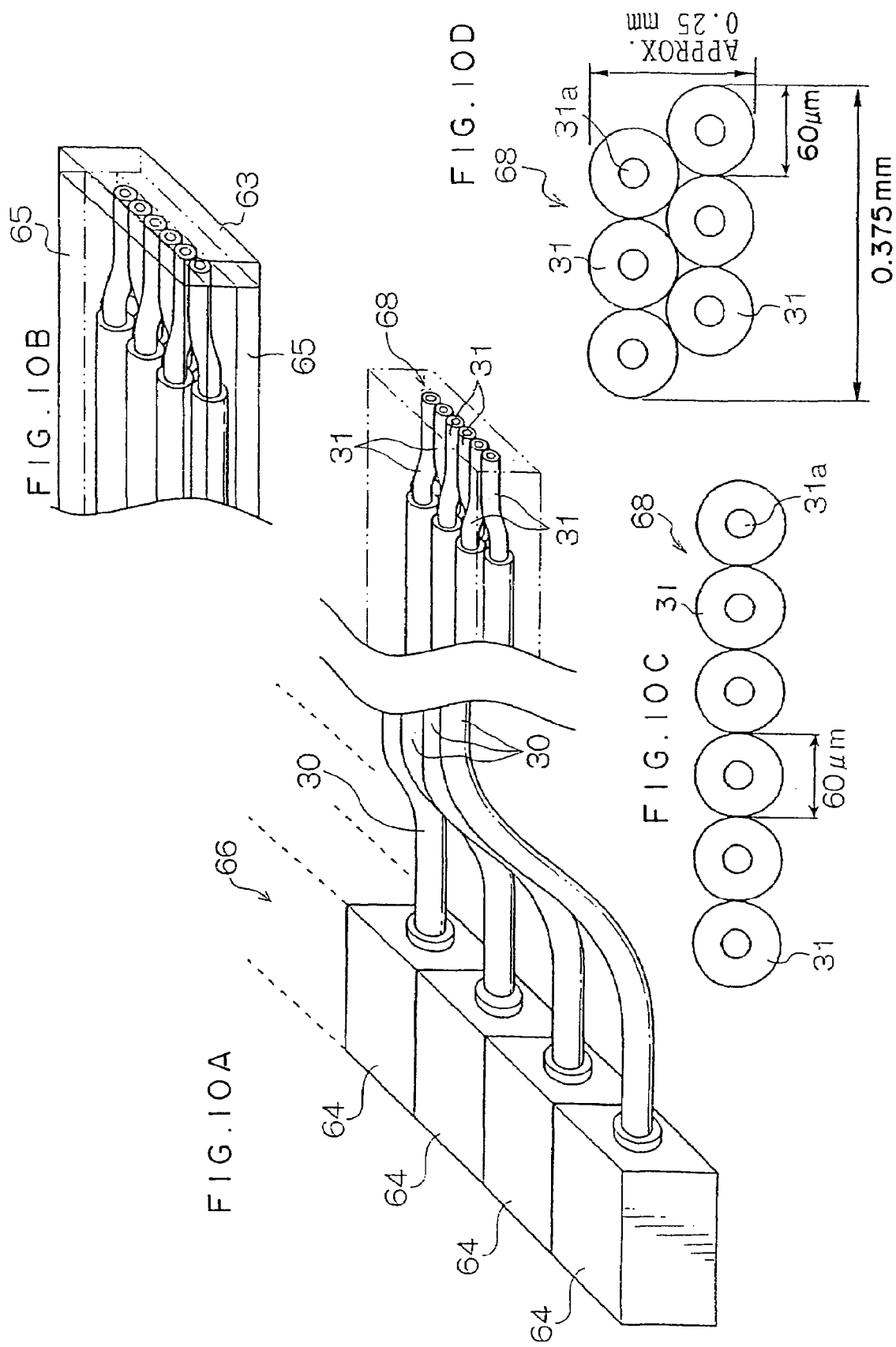

IMAGING HEAD, IMAGING DEVICE AND IMAGING METHOD

CROSS-REFERENCE TO RELATED APPLICATION

This is a divisional of application Ser. No. 10/724,621 filed Dec. 2, 2003 now U.S. Pat. No. 6,980,348. The entire disclosure of the prior application, application Ser. No. 10/724,621 is considered part of the disclosure of the accompanying

BACKGROUND OF THE INVENTION

1. Field of the Invention

The present invention relates to an imaging head, an imaging device and an imaging method, and particularly to an imaging head which relatively moves, with respect to an imaging surface, in a predetermined direction along the imaging surface, an imaging device which is equipped with this imaging head, and an imaging method which employs this imaging head.

2. Description of the Related Art

Heretofore, as examples of imaging devices, various exposure apparatuses which employ spatial light modulation elements such as digital micromirror devices (DMD) for implementing image exposure with light beams modulated in accordance with image data have been proposed.

An example of a DMD is a mirror device in which a plurality of micromirrors, which alter angles of reflection surfaces thereof in accordance with control signals, are arranged in a two-dimensional arrangement of L columns by M rows on a semiconductor support of silicon or the like. Practical exposure can be implemented by scanning the DMD in a certain direction along an exposure surface.

Generally, the micromirrors of a DMD are arranged such that directions of alignment of the respective columns intersect with directions of alignment of the respective rows. By disposing such a DMD to be inclined with respect to a scanning direction, a spacing of scanning lines at a time of scanning can be made tighter, and resolution can be raised. For example, Japanese National Publication No. 2001-521672 discloses that resolution can be raised, in an illumination system which guides light toward sub-regions (spatial light modulation elements) which are equipped with a plurality of light valves, by inclining these sub-regions with respect to projections thereof onto scanning lines.

However, fine adjustment of respective inclination angles of spatial light modulation elements is generally difficult, and the inclination angles will vary slightly from ideal angles. The spatial light modulation elements implement scanning, for example, row by row (or in units of a number of rows). However, when the above-mentioned variation occurs, the spacing of a pitch between rows when moving from a row to a next row becomes irregular, and unevenness in images is caused by gaps and/or overlaps.

In order to prevent such unevenness of images, it is considered that accuracy of the inclination angles of the spatial light modulation elements should be improved. However, production costs increase when improvements in accuracy are sought.

Similar problems can occur not only with imaging heads that employ spatial light modulation elements, but also with, for example, inkjet recording heads which implement imaging by ejecting ink droplets at an imaging surface.

SUMMARY OF THE INVENTION

In consideration of the circumstances described above, an object of the present invention is to provide an imaging head, imaging device and imaging method capable of providing images with high resolution and no unevenness, without causing a rise in costs.

In order to achieve the object described above, in a first aspect of the present invention, an imaging head which faces an imaging surface and is relatively moved along the imaging surface in a predetermined scanning direction includes: an imaging element group including a plurality of imaging elements in a plane substantially parallel to the imaging surface, the imaging elements being two-dimensionally arranged, and the imaging element group generating a group of image pixels at the imaging surface in a two-dimensional arrangement which is inclined, as a whole, at a predetermined inclination angle with respect to the scanning direction; and an alteration section which, on the basis of a difference between the predetermined inclination angle of the imaging element group and an actual inclination angle of the image pixel group, alters a number of image pixels in a direction which is inclined from the scanning direction by the actual inclination angle.

While the imaging head described above is being relatively moved in the predetermined scanning direction along the imaging surface, imaging (image recording) is carried out at the imaging surface by the plurality of imaging elements constituting the imaging element group. Because the plurality of imaging elements are arranged two-dimensionally in the plane that is substantially parallel with the imaging surface, and the two-dimensional arrangement image pixel group is generated at the imaging surface so as to be inclined, as a whole, at the predetermined angle of inclination with respect to the scanning direction, the spacing of the scanning lines of the respective pixels at the time of relative movement is made tighter, and resolution is improved.

Further, in a case in which there is a difference between the predetermined inclination angle of the imaging element group and the actual inclination angle of the image pixel group, the alteration section changes the number of image pixels in a direction that is inclined by the inclination angle from the scanning direction, on the basis of this difference. For example, in a case in which it is expected that overlapping will occur in an image, the alteration section operates such that imaging elements that would correspond to overlap portions do not operate. Conversely, in a case in which it is expected that gaps will occur in an image, imaging elements that would correspond to the gaps are pro-actively caused to operate, and the gaps are eliminated.

As a result, high quality images that are free of unevenness can be recorded. Moreover, because there is no need for rigorous accuracy in adjustment of the inclination angle of the image pixel group, a rise in costs will not be caused.

In a second aspect of the present invention, the imaging head described above can include a resolution conversion section which converts image data so as to convert a resolution of the image data in a direction intersecting the direction of relative movement to a resolution of the image pixel group in the direction intersecting the direction of relative movement. Accordingly, various processes and corrections can be carried out on the image data with higher accuracy.

Further, in a third aspect of the present invention, the conversion of the image data in such a case includes at least one of magnification and reduction of the image data.

In a fourth aspect of the present invention, the imaging element group may include a modulated light irradiation apparatus which irradiates light, which is modulated for each of pixels in accordance with image information, at an exposure surface which includes the imaging surface. In such a case, the imaging head illuminates light modulated at the respective pixels in accordance with the image information, from the modulated light irradiation apparatus, to the exposure surface, which is the imaging surface. Hence, the imaging head (exposure head) is relatively moved with respect to the exposure surface, in a direction along the exposure surface, and thus a two-dimensional image can be imaged at the exposure surface.

The imaging head of the present invention is not limited to the modulated light irradiation apparatus of the present aspect, and may be an inkjet recording head which discharges ink droplets to an imaging surface on the basis of imaging information.

As the modulated light irradiation apparatus of the present aspect, for example, a two-dimensional array light source, in which a plurality of point light sources are arranged in a two-dimensional arrangement, can be used. With such a structure, the respective point light sources emit light in accordance with the image data. This light is guided, as necessary, through a light-guiding member, such as a high-luminance fiber or the like, to a predetermined position. Further, as necessary, the light is subjected to correction by an optical system of lenses, mirrors and the like, and is irradiated at the exposure surface.

Further, in a fifth aspect of the present invention, the modulated light irradiation apparatus may include: a laser device which irradiates laser light; a spatial light modulation element at which a plurality of imaging element portions, which respectively alter light modulation states in accordance with control signals, are arranged in a two-dimensional arrangement, the spatial light modulation element modulating the laser light irradiated from the laser device; and a control section which controls the imaging element portions by the control signals, which are generated in accordance with the image information.

With this structure, the light modulation states of the respective imaging element portions of the spatial light modulation element are changed by the control section, and the laser light irradiated at the spatial light modulation element is modulated and irradiated at the exposure surface. Needless to say, as necessary, a light-guiding member such as a high-luminance fiber or the like, an optical system of lenses, mirrors and the like, and the like may be utilized.

In a sixth aspect of the present invention, a micromirror device which includes a plurality of micromirrors arranged in a two-dimensional arrangement, angles of reflection surfaces of which micromirrors are respectively alterable in accordance with the control signals, may be employed as the spatial light modulation element.

Further, in a seventh aspect of the present invention, a liquid crystal shutter array which includes a plurality of liquid crystal cells arranged in a two-dimensional arrangement, the liquid crystal cells being respectively capable of blocking transmitted light in accordance with the control signals, may be employed as the spatial light modulation element.

In an eighth aspect of the present invention, an imaging device includes the imaging head and a movement section which relatively moves the imaging head at least in the predetermined direction.

According to the present aspect, when a process such as exposure, ink discharge or the like is applied to the imaging surface by the imaging head, the imaging head is synchronously relatively moved, with respect to the imaging surface, to implement imaging on the imaging surface.

When the imaging device of the present aspect includes an imaging head based on any of the aspects described above, a high quality image that is free of unevenness can be recorded, and a rise in costs will not result.

In a ninth aspect of the present invention, an imaging method which employs an imaging head based on any of the aspects described above and relatively moves the imaging head along the imaging surface in the predetermined scanning direction for imaging, includes the steps of: altering the number of image pixels that are employed in the direction which is inclined from the scanning direction by the actual inclination angle, on the basis of the difference between the predetermined inclination angle of the imaging element group and the actual inclination angle of the image pixel group; and employing the altered number of image pixels for imaging at the imaging surface.

According to the present aspect, while the imaging head is being relatively moved in the predetermined scanning direction along the imaging surface, the imaging is carried out at the imaging surface by the plurality of imaging elements constituting the imaging element group. The plurality of imaging elements are arranged two-dimensionally in the plane that is substantially parallel with the imaging surface. Further, the two-dimensional arrangement image pixel group is generated at the imaging surface so as to be inclined, as a whole, at the predetermined angle of inclination with respect to the scanning direction. Consequently, the spacing of the scanning lines of the respective pixels at the time of relative movement is made tighter, and resolution is improved.

Further, in a case in which there is a difference between the predetermined inclination angle of the imaging element group and an actual inclination angle of the image pixel group, the number of image pixels in a direction that is inclined to the extent of the inclination angle from the scanning direction is changed for imaging on the basis of this difference. For example, in a case in which it is expected that overlapping will occur in an image, the imaging element group is operated such that imaging elements that would correspond to overlap portions do not operate. Conversely, in a case in which it is expected that gaps will occur in an image, imaging elements that would correspond to the gaps are pro-actively caused to operate, and the gaps are eliminated.

As a result, high quality images that are free of unevenness can be recorded. Moreover, because there is no need for rigorous accuracy in adjustment of the inclination angle of the image pixel group, a rise in costs will not be caused.

BRIEF DESCRIPTION OF THE DRAWINGS

FIG. 2 is a perspective view showing structure of a scanner of the exposure device relating to the first embodiment of the present invention.

FIG. 4 is a perspective view showing general structure of an exposure head of the exposure device relating to the first embodiment of the present invention.

FIG. 5A is a sectional view, cut along an optical axis, which shows structure of the exposure head shown in FIG. 4.

FIG. 5B is a side view of FIG. 5A.

FIG. 6 is a partial enlarged view showing structure of a digital micromirror device (DMD) relating to the exposure head of the first embodiment of the present invention.

FIG. 10A is a perspective view showing structure of a fiber array light source.

FIG. 10B is a partial enlarged view of FIG. 10A.

FIG. 10C is a plan view showing an arrangement of light emission points at a laser emission portion.

FIG. 10D is a plan view showing another arrangement of light emission points at a laser emission portion.

DETAILED DESCRIPTION OF THE INVENTION

Figure 1:
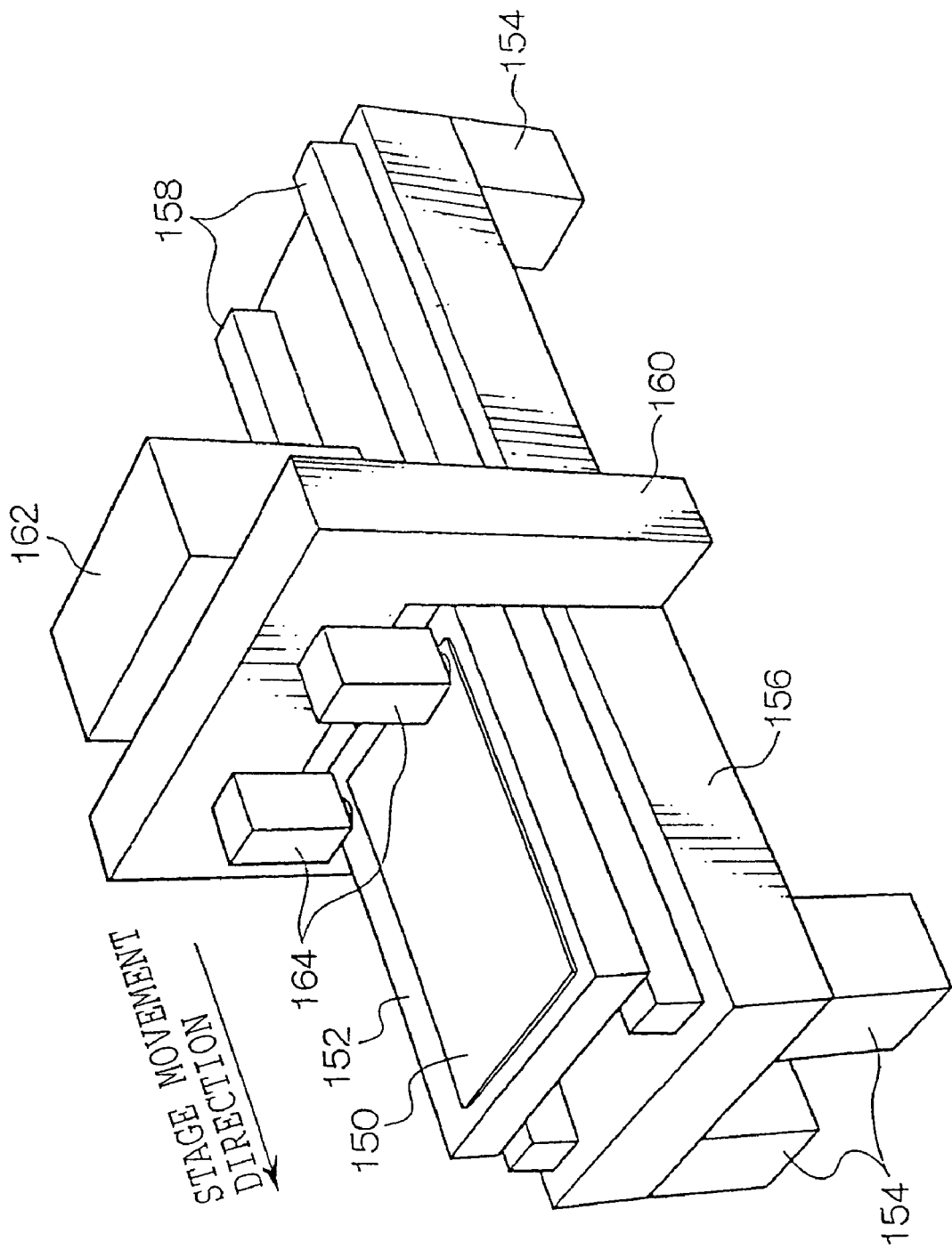
FIG. 1 is a perspective view showing external appearance of an exposure device relating to a first embodiment of the present invention.

An imaging device relating to an embodiment of the present invention is formed as a "flatbed"-type exposure apparatus. As shown in FIG. 1, the imaging device is provided with a flat board-form stage 152, which adsorbs and retains a sheet-form photosensitive material 150 at a surface thereof. Two guides 158, which extend in a stage movement direction, are provided at an upper face of a thick board-form equipment platform 156, which is supported by four leg portions 154.

The stage 152 is disposed such that a longitudinal direction thereof is oriented in the stage movement direction, and is supported by the guides 158 so as to be movable backward and forward.

In this exposure apparatus, an unillustrated driving apparatus is provided for driving the stage 152 along the guides 158.

At a central portion of the equipment platform 156, an 'n'-like gate 160 is provided so as to straddle a movement path of the stage 152. Respective end portions of the 'n'-like gate 160 are fixed at two side faces of the equipment platform 156.

Sandwiching the gate 160, a scanner 162 is provided at one side, and a plurality (for example, two) of detection sensors 164 are provided at the other side. The detection sensors 164 detect a leading end and a trailing end of the photosensitive material 150. The scanner 162 and the detection sensors 164 are respectively mounted at the gate 160, and are fixedly disposed upward of the movement path of the stage 152.

The scanner 162 and detection sensors 164 are connected to an unillustrated controller which controls the scanner 162 and detection sensors 164. As described later, the scanner 162 and detection sensors 164 are controlled such that, at a time of exposure by exposure heads 166, the exposure heads 166 effect exposure with predetermined timings.

Figure 3A:
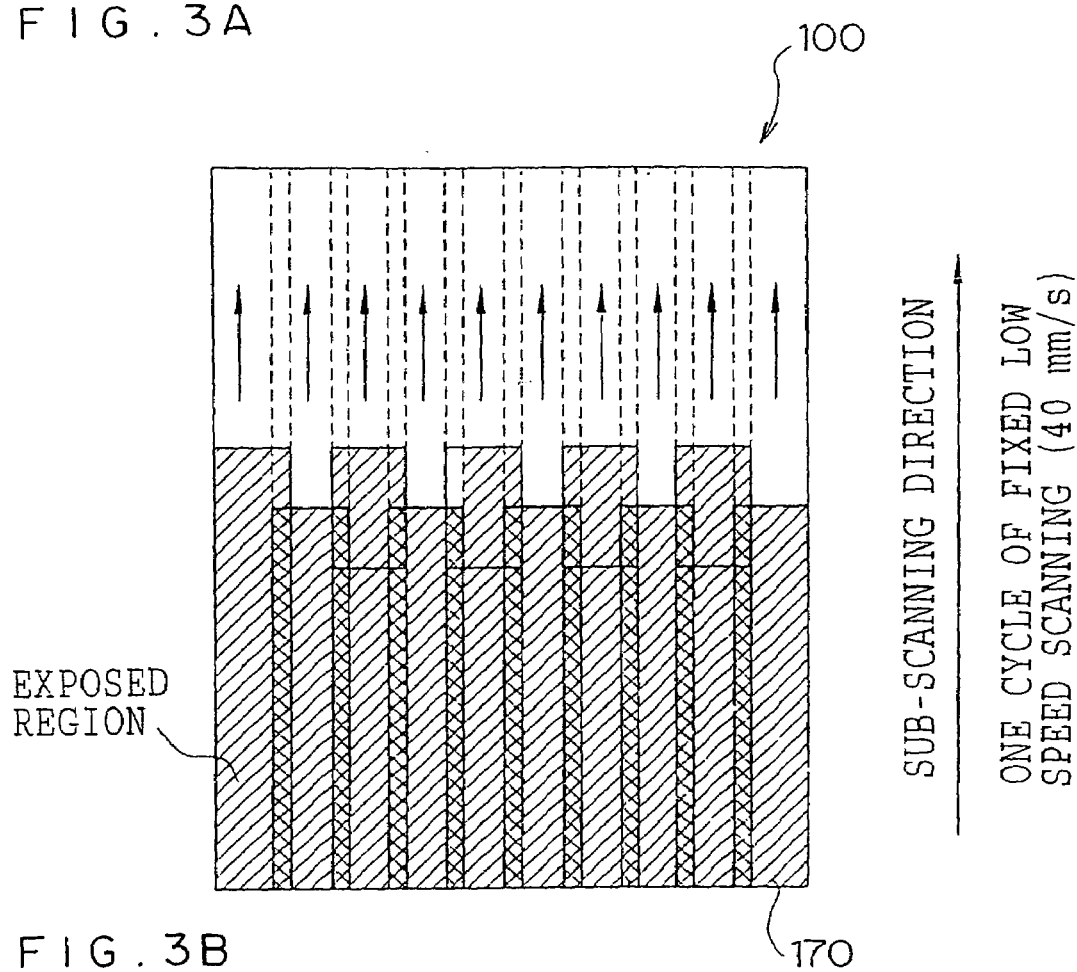
FIG. 3A is a plan view showing exposed regions formed at a photosensitive material.
Figure 3B:
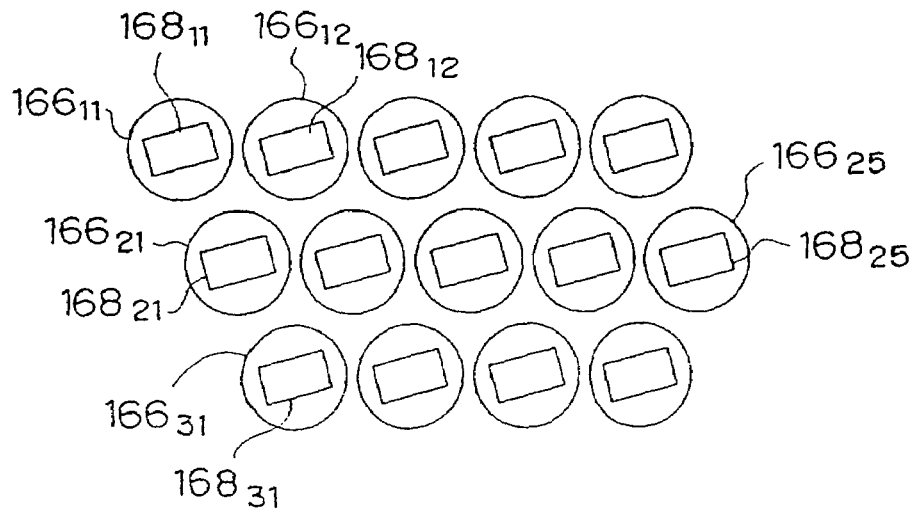
FIG. 3B is a view showing an arrangement of exposure areas of respective exposure heads.

As shown in FIGS. 2 and 3B, the scanner 162 is equipped with a plurality of the exposure heads 166, which are arranged substantially in a matrix pattern with m rows and n columns (for example, three rows and five columns). In this example, in consideration of width of the photosensitive material 150, four of the exposure heads 166 are provided in the third row, and there are fourteen exposure heads 166 in total. Note that when an individual exposure head which is arranged in an m-th row and an n-th column is to be referred to, that exposure head is denoted as exposure head $166_{mn}$.

Exposure areas 168 covered by the exposure heads 166 have rectangular shapes with short sides thereof aligned in a scanning direction, as in FIG. 2, and are inclined at a predetermined inclination angle θ, which is discussed later, with respect to the scanning direction. Hence, in accordance with movement of the stage 152, band-form exposed regions 170 are formed on the photosensitive material 150 at the respective exposure heads 166. Note that when an exposure area corresponding to an individual exposure head which is arranged in an m-th row and an n-th column is to be referred to, that exposure area is denoted as exposure area $168_{mn}$.

As shown in FIGS. 3A and 3B, in each row, the respective exposure heads, which are arranged in a line, are disposed to be offset by a predetermined interval in a row arrangement direction (which interval is an integer multiple (two in the present embodiment) of the long dimension of the exposure areas), such that the band-form exposed regions 170 partially overlap with respective neighboring the exposed regions 170. Thus, a portion that cannot be exposed between exposure area $168_{11}$ and exposure area $168_{12}$ of the first row can be exposed by exposure area $168_{21}$ of the second row and exposure area $168_{31}$ of the third row.

As shown in FIGS. 4, 5A and 5B, at each of the exposure areas $166_{11}$ to $166_{mn}$, a digital micromirror device (DMD) 50 is provided to serve as a spatial light modulation element for modulating an incident light beam at each of pixels in accordance with image data. The DMD 50 is connected with an unillustrated controller, which is provided with a data processing section and a mirror driving control section.

At the data processing section of this controller, on the basis of inputted image data, driving signals are generated for driving control of each micromirror in a region of the DMD 50 at the corresponding exposure head 166 which region is to be controlled. Herein, the controller includes an image data conversion function for making resolution in a direction perpendicular to the scanning direction higher than in an original image.

By raising the resolution thus, various processes and corrections of the image data can be implemented with higher accuracy. For example, in a case in which a number of pixels employed is altered in accordance with an inclination angle of the DMD 50 and a row pitch is corrected, as described later, correction with higher accuracy is enabled. This conversion of the image data enables conversions which include magnification or reduction of the image data.

The mirror driving control section controls the angle of a reflection surface of each micromirror of the DMD 50 at the corresponding exposure head 166 on the basis of the control signals generated at the image data processing section. Control of the angles of the reflection surfaces is described later.

A fiber array light source 66, a lens system 67 and a mirror 69 are disposed in this order at a light incidence side of the DMD 50. The fiber array light source 66 is equipped with a laser emission portion at which emission end portions (light emission points) of optical fibers are arranged in a row along a direction corresponding to the direction of the long sides of the exposure area 168. The lens system 67 corrects laser light that is emitted from the fiber array light source 66, and focuses the light on the DMD 50. The mirror 69 reflects the laser light that has been transmitted through the lens system 67 toward the DMD 50.

The lens system 67 is structured with a single pair of combination lenses 71, which make the laser light that has been emitted from the fiber array light source 66 parallel, a single pair of combination lenses 73, which correct the laser light that has been made parallel such that a light amount distribution is more uniform, and a condensing lens 75 which focuses the laser light whose light amount distribution has been corrected on the DMD.

The combination lenses 73 have the functions of, in the direction of arrangement of the laser emission ends, broadening portions of light flux that are close to an optical axis of the lenses and constricting portions of the light flux that are distant from the optical axis, and in a direction intersecting this direction of arrangement, transmitting the light unaltered. Thus, the laser light is corrected such that the light amount distribution is uniform.

Lens systems 54 and 58 are disposed at a light reflection side of the DMD 50. The lens systems 54 and 58 focus the laser light that has been reflected at the DMD 50 on a scanning surface (a surface that is to be exposed) 56 of the photosensitive material 150. The lens systems 54 and 58 are disposed such that the DMD 50 and the surface to be exposed 56 have a conjugative relationship.

The present embodiment is specified such that, after the laser light emitted from the fiber array light source 66 has expanded by substantially five times, the laser light is contracted to approximately 5 μm for each pixel by these lens systems 54 and 58.

As shown in FIG. 6, at the DMD 50, very small mirrors (micromirrors) 62, which are supported by support columns, are disposed on an SRAM cell (memory cell) 60. The DMD 50 is a mirror device which is constituted of a large number (for example, 1024 by 768, with a pitch of 13.68 μm) of these extremely small mirrors arranged in a checkerboard pattern, which extremely small mirrors structure image elements (pixels). At each pixel, the micromirror 62 is provided so as to be supported at an uppermost portion of the support column. A material with high reflectivity, such as aluminium or the like, is applied by vapor deposition at a surface of the micromirror 62. Here, the reflectivity of the micromirror 62 is at least 90%.

The SRAM cell 60 with CMOS silicon gates, which is produced by a conventional semiconductor memory production line, is disposed directly under the micromirror 62, with the support column, which includes a hinge and a yoke, interposed therebetween. The whole of this structure is monolithic (an integrated form).

Figure 7A:
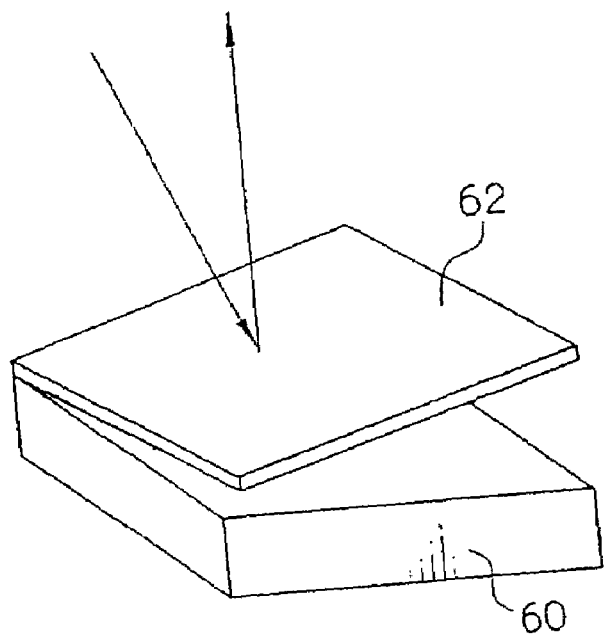
FIGS. 7A and 7B are explanatory views for explaining operation of the DMD relating to the exposure head of the first embodiment of the present invention.
Figure 7B:
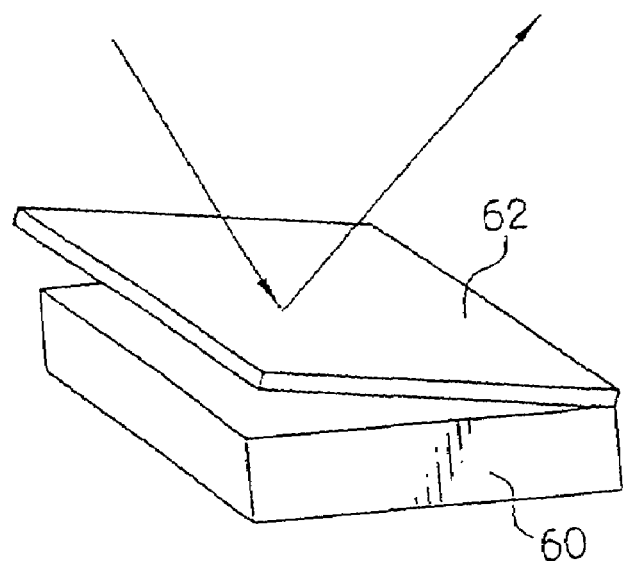

When digital signals are written to the SRAM cell 60 of the DMD 50, the micromirrors 62 supported at the support columns are inclined, about a diagonal, within a range of ±α° (for example, ±10°) relative to the side of a substrate on which the DMD 50 is disposed. FIG. 7A shows a state in which the micromirror 62 is inclined at +α°, which is an 'ON' state, and FIG. 7B shows a state in which the micromirror 62 is inclined at −α°, which is an 'OFF' state.

Accordingly, as a result of control of the inclinations of the micromirrors 62 at the pixels of the DMD 50 in accordance with image signals, as shown in FIG. 6, light that is incident at the DMD 50 is reflected in directions of inclination of the respective micromirrors 62.

FIG. 6 shows a portion of the DMD 50 enlarged, and shows an example of a state in which the micromirrors 62 are controlled to +α° or −α°. The ON-OFF control of the respective micromirrors 62 is carried out by the unillustrated controller connected to the DM 50. A light-absorbing body (which is not shown) is disposed in the direction in which light beams are reflected by the micromirrors 62 that are in the OFF state.

Figure 8A:
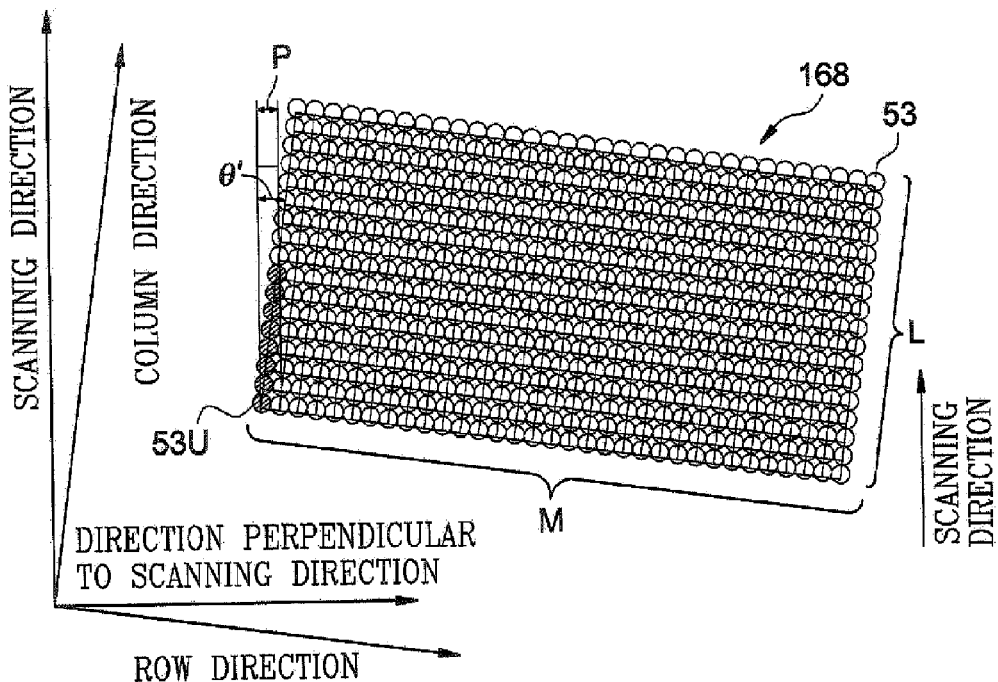
FIGS. 8A and 8B are explanatory views of exposure areas of the exposure head of the first embodiment of the present invention, which show positions of exposure beams from the DMD, which is inclinedly disposed.
Figure 8B:
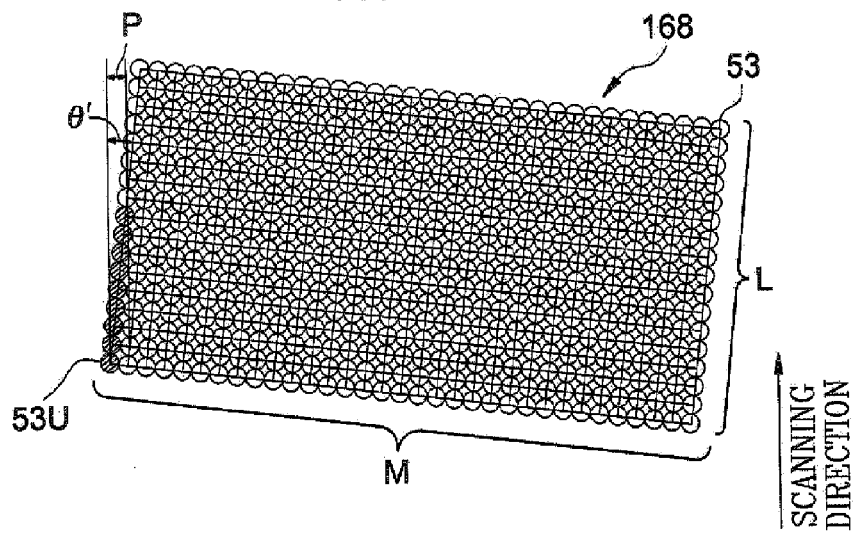

FIGS. 8A and 8B show the exposure area 168, which is a two-dimensional image provided by one of the DMDs 50. The exposure area 168 is divided into respective pixels of M columns by L rows, corresponding to exposure beams 53.

In the example of FIGS. 8A and 8B, M=33 and L=17. However, in practice, as mentioned above, one of the exposure areas 168 will often be structured by a greater number of the exposure beams 53 than in this example. Therefore, when a case for which specific numbers are given is described hereinbelow, it should be assumed that M=1024 and L=256 therein.

The DMD 50 is inclinedly disposed such that this exposure area 168 is angled at the predetermined inclination angle with respect to the scanning direction. When the exposure area 168 is inclined thus, a pitch in a direction perpendicular to the scanning direction of scanning paths (scanning lines) of the exposure beams 53 from the respective micromirrors becomes smaller (approximately 0.27 μm in the present embodiment), and is narrower than a pitch in a direction perpendicular to the scanning direction of scanning lines in a case in which the exposure area 168 is not inclined and than a resolution of the image data itself (2 μm). Thus, resolution can be improved.

Now, in a case in which the angle of the DMD 50 is adjusted in order to incline the exposure area at the predetermined inclination angle as described above, it is difficult to bring accuracy of this angle adjustment to second-scale accuracy, and an actual inclination angle θ' may be offset from the ideal inclination angle θ. However, regardless of the value of the actual inclination angle θ', it is preferable that a pitch P of the image in the direction perpendicular to the scanning direction is fixed.

Accordingly, in the present embodiment, the number of pixels employed in the column direction is altered for imaging (image recording) in accordance with the actual inclination angle θ' by an unillustrated controller, and thus variation of the pitch P is suppressed to a certain range.

For example, when FIGS. 8A and 8B are compared, the actual inclination angle θ' in FIG. 8B is smaller than the actual inclination angle θ' in FIG. 8A. Accordingly, in the case of FIG. 8B, the number of pixels employed in the column direction is increased relative to FIG. 8A. Thus, variation of the pitch P is countered and the pitch P is made substantially constant. Specifically, when numbers of hatched (in the drawing) pixels in the column direction in FIGS. 8A and 8B (employed pixels 53U) are considered, there are eight such pixels in FIG. 8A, in comparison to nine in FIG. 8B.

Figure 9A:
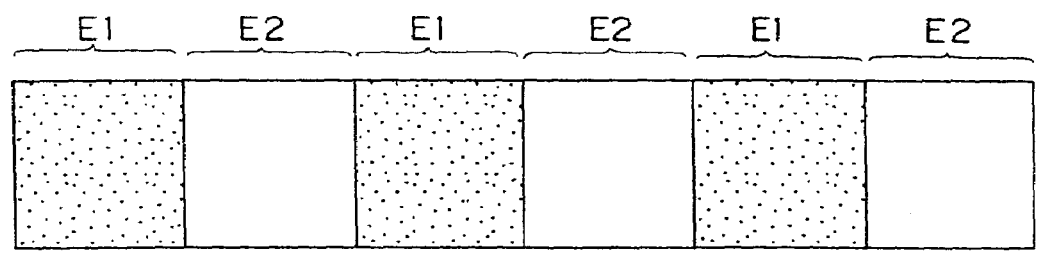
FIG. 9A shows an image formed by the exposure head of the first embodiment of the present invention, which is an image according to original image data.
Figure 9B:
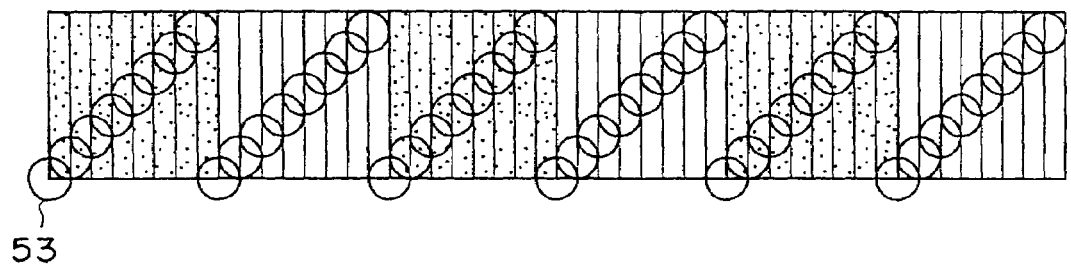
FIGS. 9B and 9C show images formed by the exposure head of the first embodiment of the present invention, which are images according to converted image data.
Figure 9C:
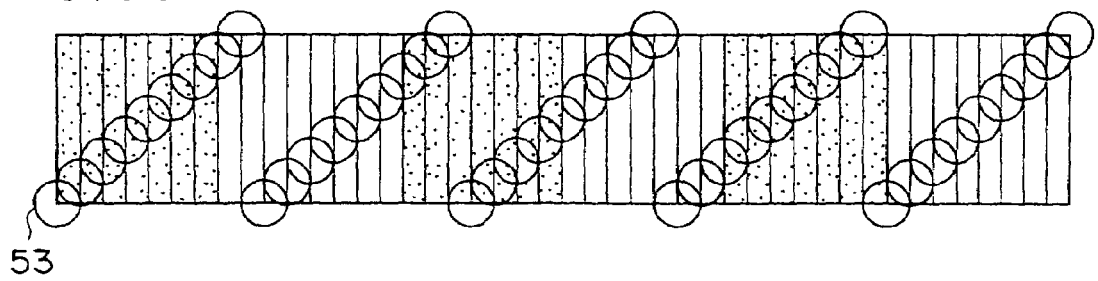

When the number of pixels employed is altered thus, the pitch of the image in the row direction is finely adjusted. In accordance therewith, conversion of the image data is preferable. FIGS. 9A to 9C show examples of such conversion of image data.

FIG. 9A is an example of original image data. Here, an image in which regions E1, to which shading dots are applied, and blank white regions E2 are arranged alternately in a horizontal direction is supposed. FIG. 9B is an example of image data that has been converted in a case in which the number of pixels employed in the column direction is eight, as in FIG. 8A, and FIG. 9C is an example of image data that has been converted in a case in which the number of pixels employed in the column direction is nine, as in FIG. 8B.

By carrying out suitable conversion of the image data in this manner, an image similar to the original image can be provided even after conversion.

Herebelow, the suppression of variation of the aforementioned pitch P to a certain range, by altering the number of pixels employed in the column direction for imaging (image recording) in accordance with the actual inclination angle θ', will be described in further detail with reference to FIGS. 9A to 9C.

Figure 15:
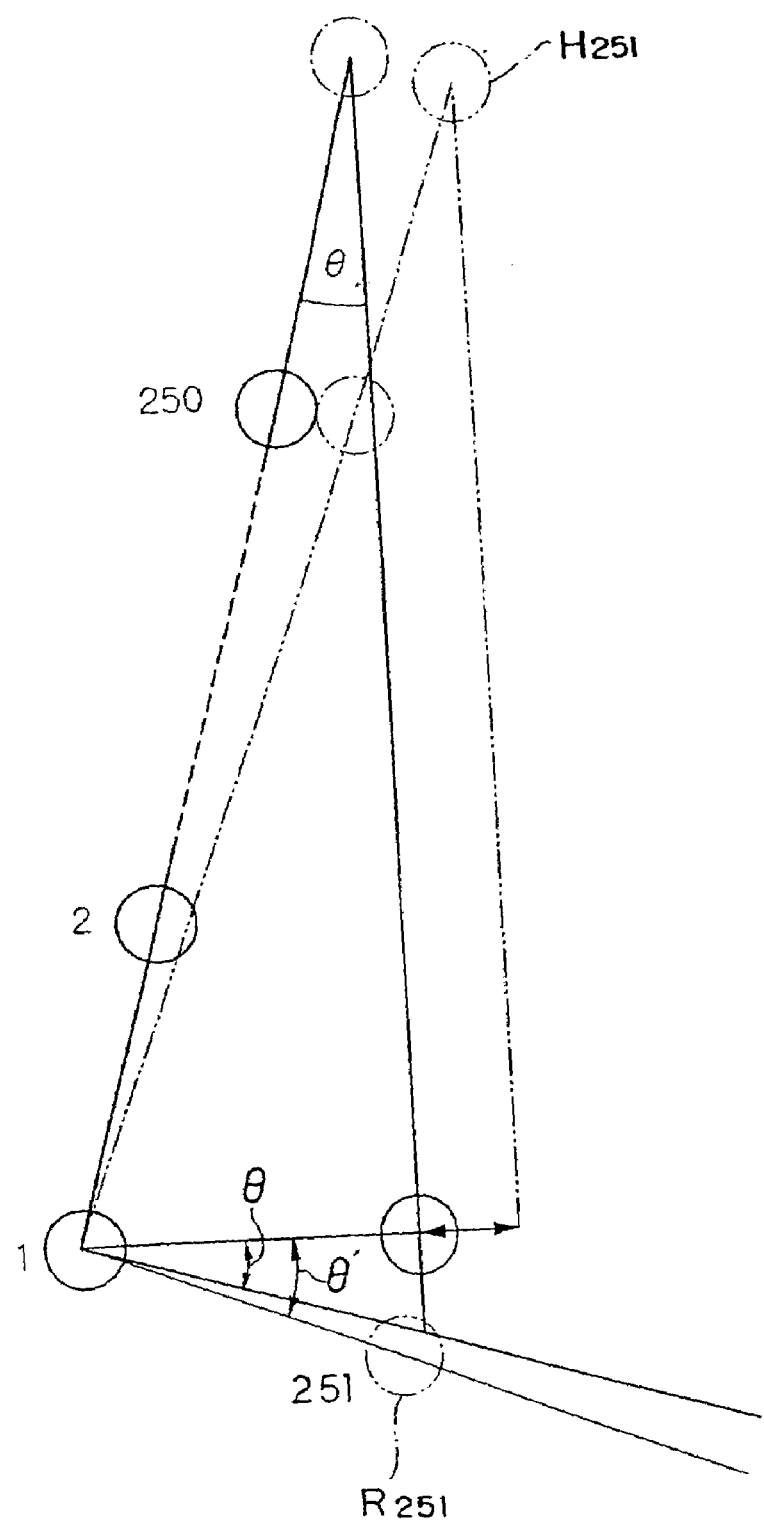
FIG. 15 is an explanatory view showing a relationship between an expected position of a pixel of the present invention and an actual position of the pixel in a case in which an exposure head is inclined.

FIG. 15 shows an example of shifting of pixels in a case in which the actual inclination angle θ' is greater than the ideal inclination angle θ. Here, for a case in which a number of pixels employed is 250, for an example, variation of a 251 st pixel between an ideal position H251 and an actual position R251 is illustrated.

The ideal inclination angle θ, when 250 is taken as a center value for the number of pixels employed, is 825.1 seconds. However, because the actual inclination angle θ' is larger than this, the actual position R251 of the 251 st pixel is shifted from the ideal position H251. Accordingly, in this case, if the number of pixels employed is decreased, the above-mentioned variation can be made smaller as a result.

Conversely, in a case in which the actual inclination angle θ' is smaller than the ideal inclination angle θ, the above-mentioned variation can be made smaller by increasing the number of pixels employed.

In the present embodiment, given that an ideal inclination angle θ of 825.1 seconds corresponds to 250 pixels, the inclination angle may be corrected in units of approximately 3.3 seconds per pixel of alteration.

Figure 16:
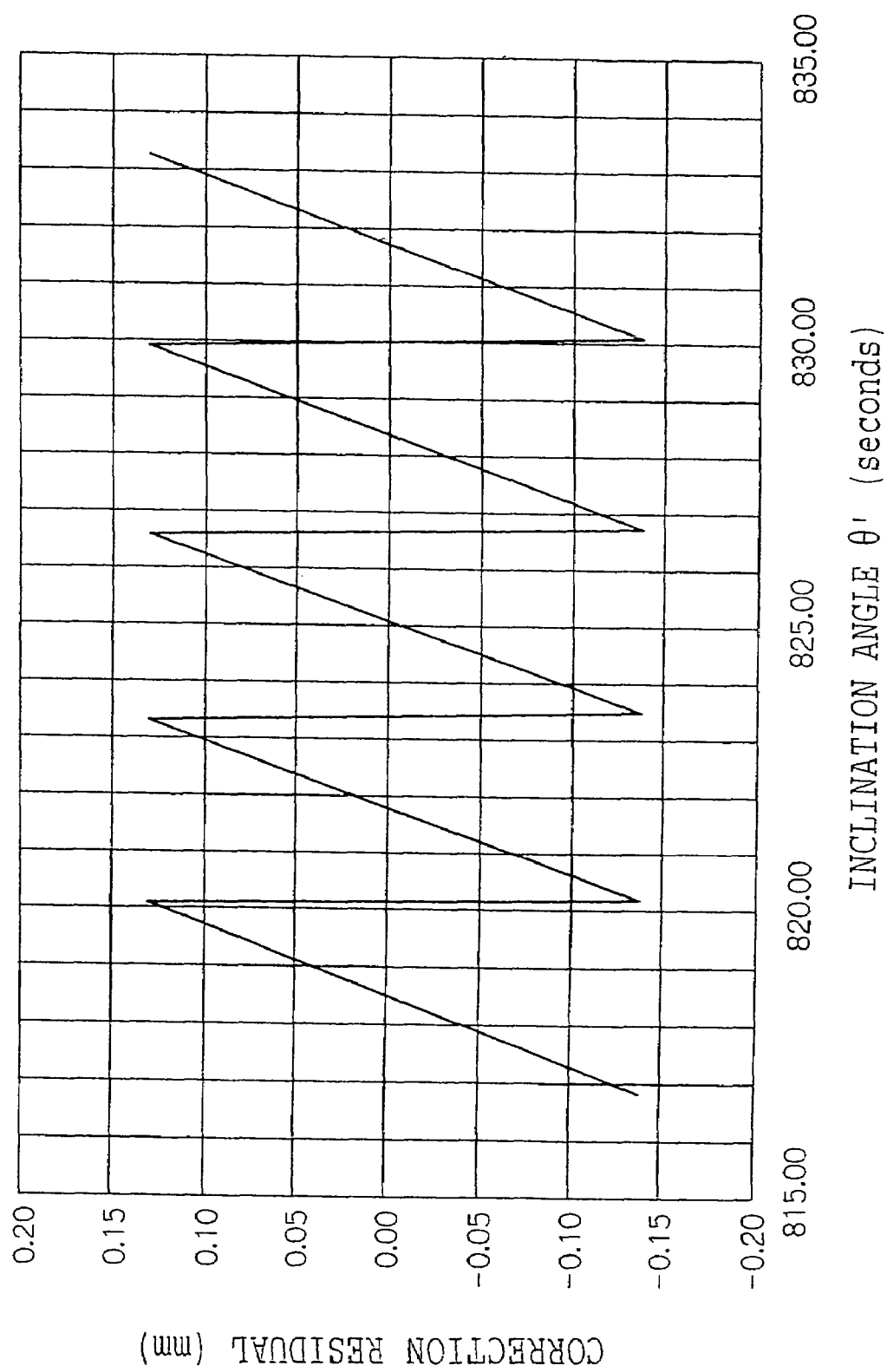
FIG. 16 is a graph showing a relationship, in the present invention, between an inclination angle of an exposure head and a correction residual when a number of pixels employed is altered.

FIG. 16 shows a relationship, in the case of the present embodiment, between the actual inclination angle θ' and a correction residual (a difference between an ideal value and an actual value of row pitch) after the correction described above is carried out, as a graph. In this graph, 825.1 seconds, the ideal inclination angle, is the center point in a horizontal axis direction. When the actual inclination angle θ' coincides with this value, there is no variation. Accordingly, there is no need for correction, and the correction residual is zero.

Hence, as the actual inclination angle θ' increases beyond 825.1 seconds and the actual value of the row pitch becomes larger than the ideal value thereof, the correction residual gradually grows to a plus side. When θ' reaches a specific value (to be precise, θ'=826.75 seconds), the number of pixels employed is decremented by one, to 249. As a result, the actual value of the row pitch is decreased by one pixel, and the correction residual switches to a minus side. Hence, as the actual inclination angle θ' increases therefrom, the correction residual again gradually grows, crosses over to the plus side and becomes larger. When θ' again reaches a specific value (to be precise, 830.05 seconds), the number of pixels employed is again decremented by one, to 248.

On the other hand, as the actual inclination angle θ' decreases from 825.1 seconds and the actual value of the row pitch becomes smaller than the ideal value thereof, the correction residual gradually grows to the minus side. When θ' reaches a specific value (to be precise, θ'=823.35 seconds), the number of pixels employed is incremented by one, to 251. As a result, the actual value of the row pitch is increased by one pixel, and the correction residual switches to the plus side. Hence, as the actual inclination angle θ' decreases therefrom, the correction residual again gradually grows to the minus side, crosses over to the minus side and becomes larger. When θ' again reaches a specific value (to be precise, 830.05 seconds), the number of pixels employed is again decremented by one, to 248.

By adjusting the number of pixels employed stepwise in accordance with the value of θ' in this manner, it is possible to keep the correction residual within a certain range (in the present embodiment, no more than ±0.14 μm).

Now, if, for example, a specific sample image is recorded and the above-described alterations of the number of pixels employed are carried out such that variations in the pitch P that are found from inspection of the sample image are eliminated, the number of pixels employed can be set to a suitable number at low cost. Of course, if it is possible to accurately measure the actual inclination angle θ' itself, the number of pixels employed may be determined on the basis of results of such measurement.

FIG. 10A shows structure of the fiber array light source 66. The fiber array light source 66 is equipped with a plurality (for example, six) of laser modules 64. At each of the laser modules 64, one end of a multi-mode optical fiber 30 is connected.

At the other end of the multi-mode optical fiber 30, an optical fiber 31, whose core diameter is the same as that of the multi-mode optical fiber 30 and whose cladding diameter is smaller than that of the multi-mode optical fiber 30, is connected. As shown in FIG. 10C, emission end portions of the multi-mode optical fibers 31 (light emission points) are arranged in a single row along the direction perpendicular to the scanning direction, which intersects the sub-scanning direction, to structure a laser emission portion 68.

Note that the light emission points may be arranged in two rows along the direction perpendicular to the scanning direction, as shown in FIG. 10D.

As is shown in FIG. 10B, the emission end portions of the optical fibers 31 are interposed and fixed between two support plates 65, which have flat faces. Furthermore, a transparent protective plate 63, of glass or the like, is disposed at the light emission side of the optical fibers 31 in order to protect end faces of the optical fibers 31. The protective plate 63 may be disposed to be closely contacted with the end faces of the optical fibers 31, and may be disposed such that the end faces of the optical fibers 31 are sealed.

The emission end portions of the optical fibers 31 have high optical density, tend to attract dust, and are susceptible to deterioration. However, by disposing the protective plate 63 thus, adherence of dust to the end faces can be prevented and deterioration can be slowed.

As the multi-mode optical fibers 30 and the optical fibers 31, any of step index-type optical fibers, graded index-type optical fibers and multiplex-type optical fibers can be used. For example, a step index-type optical fiber produced by Mitsubishi Cable Industries, Ltd. could be used.

Figure 11:
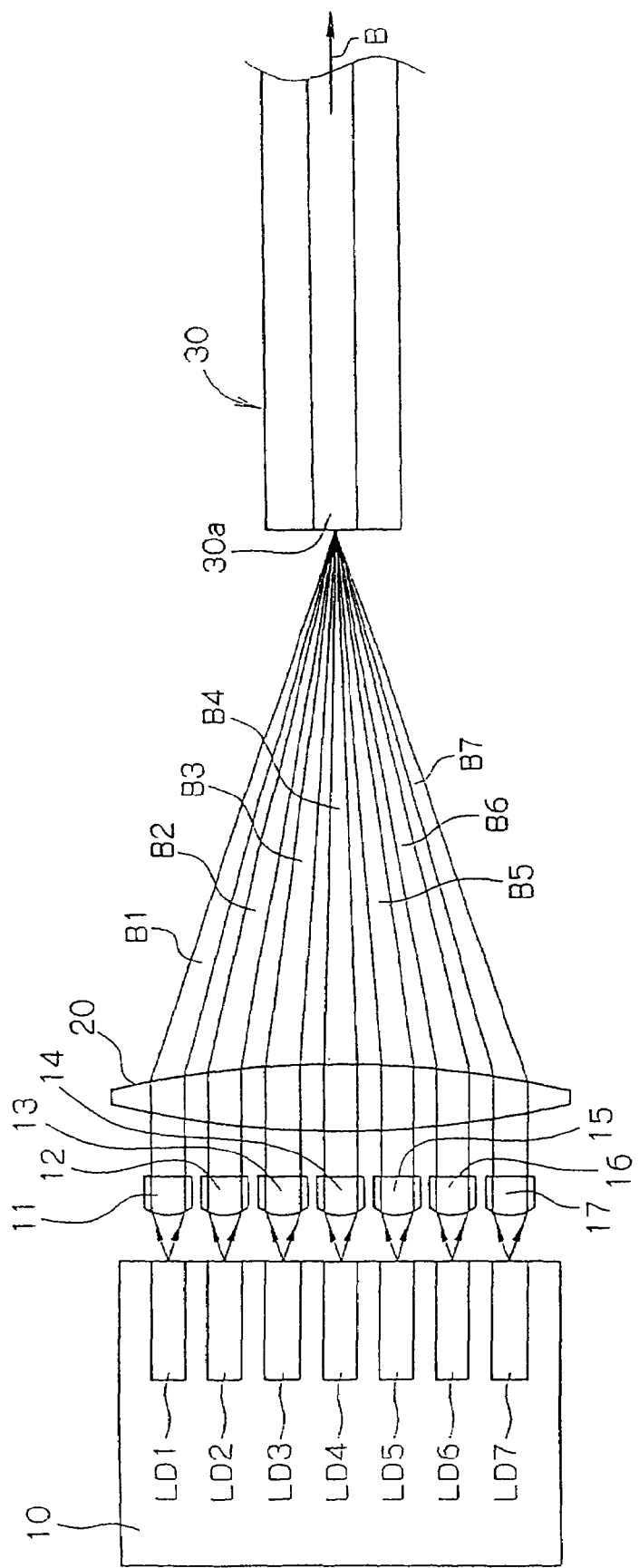
FIG. 11 is a plan view showing structure of a multiplex laser light source relating to the first embodiment of the present invention.

The laser module 64 is structured by a multiplexed laser light source (fiber light source) shown in FIG. 11. This multiplex laser light source is structured with a plurality (for example, seven) of chip-form lateral multi-mode or single-mode GaN-based semiconductor lasers LD1, LD2, LD3, LD4, LD5, LD6 and LD7, collimator lenses 11, 12, 13, 14, 15, 16 and 17, a single condensing lens 20, and one unit of the multi-mode optical fibers 30. The GaN-based semiconductor lasers LD1 to LD7 are fixedly arranged on a heat block 10. The collimator lenses 11 to 17 are provided in correspondence with the GaN-based semiconductor lasers LD1 to LD7, respectively.

Note that the number of semiconductor lasers is not limited to seven.

The GaN-based semiconductor lasers LD1 to LD7 all have a common oscillation wavelength (for example, 405 nm), and a common maximum output (for example, 100 mW for multi-mode lasers, 30 mW for single-mode lasers). For the GaN-based semiconductor lasers LD1 to LD7, lasers can be utilized which are provided with an oscillation wavelength different from the above-mentioned 405 nm, in a wavelength range of 350 nm to 450 nm.

Figure 12:
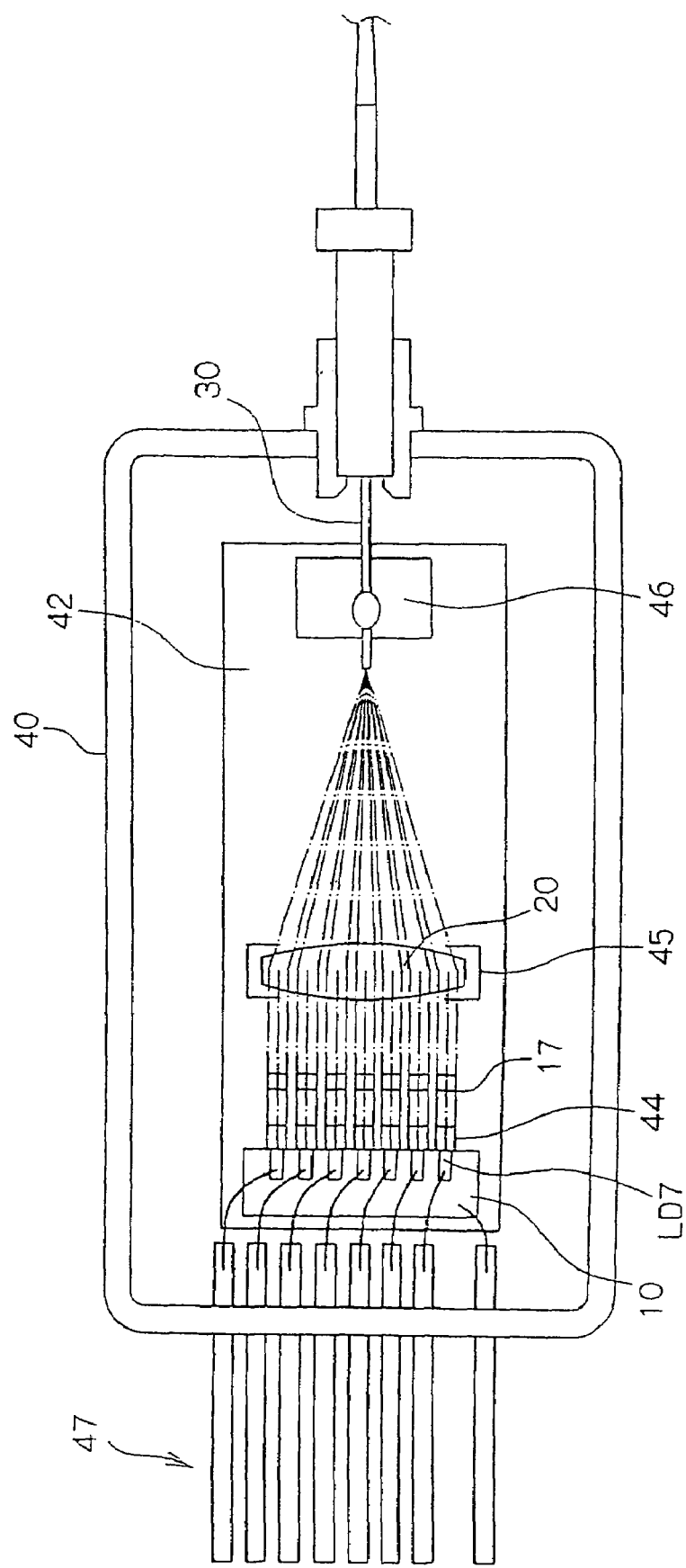
FIG. 12 is a plan view showing structure of a laser module relating to the first embodiment of the present invention.
Figure 13:
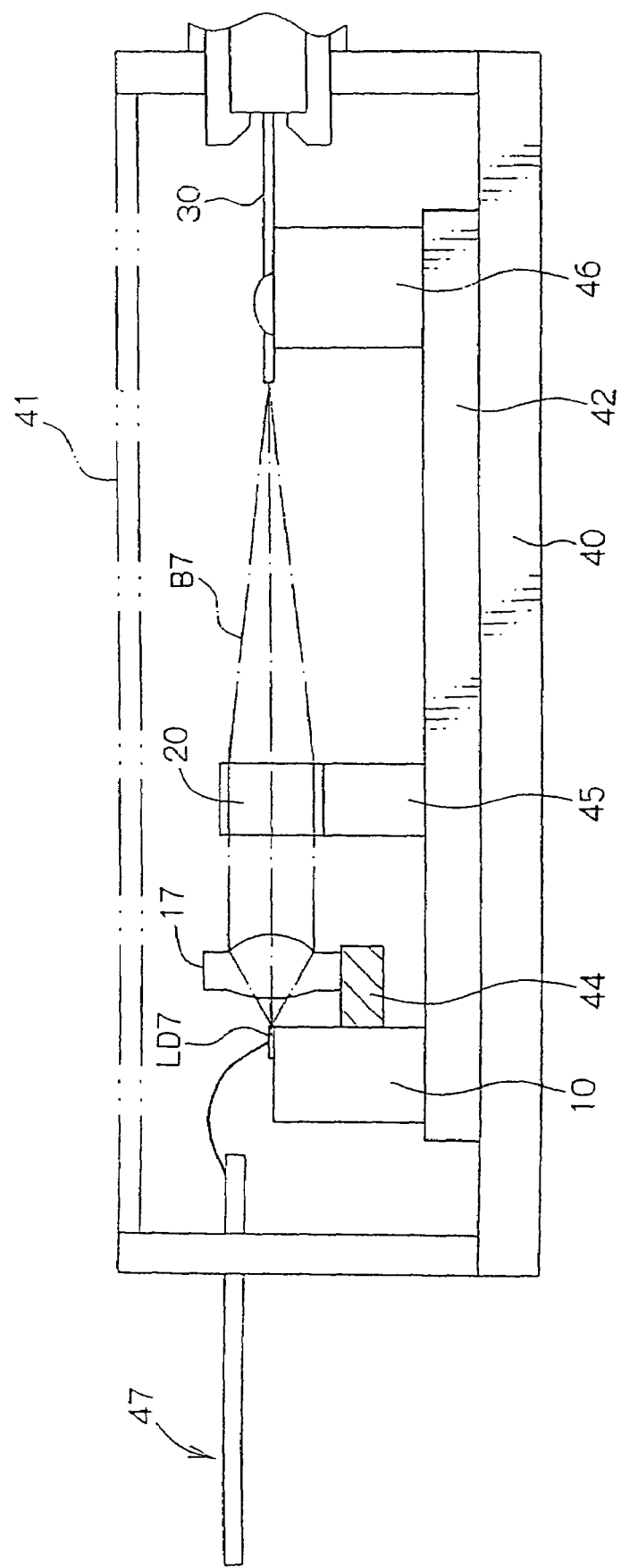
FIG. 13 is a side view showing structure of the laser module shown in FIG. 12.

As shown in FIGS. 12 and 13, the above-described multiplex laser light source, together with other optical elements, is accommodated in a box-like package 40, which opens upward. The package 40 is provided with a package lid 41 prepared so as to close this opening of the package 40. After a degassing treatment, sealed gas is introduced and the opening of the package 40 is closed by the package lid 41. Thus, the above-described multiplex laser light source is hermetically sealed in a closed space (sealed space) formed by the package 40 and the package lid 41.

A baseplate 42 is fixed at a lower face of the package 40. The heat block 10, a condensing lens holder 45 and a fiber holder 46 are attached at an upper face of the baseplate 42. The condensing lens holder 45 holds the condensing lens 20. The fiber holder 46 holds an incidence end portion of the multi-mode optical fiber 30. An opening is formed in a wall face of the package 40. The emission end portion of the multi-mode optical fiber 30 is led out through this opening to outside the package.

A collimator lens holder 44 is attached at a side face of the heat block 10, and holds the collimator lenses 11 to 17. Openings are formed in a lateral wall face of the package 40. Wiring 47, which supplies driving current to the GaN-based semiconductor lasers LD1 to LD7, is passed through these openings and led out to outside the package 40.

Note that in FIG. 13, in order to alleviate complexity of the drawing, only the GaN-based semiconductor laser LD7 is marked with a reference numeral, of the plurality of GaN-based semiconductor lasers, and only the collimator lens 17 is marked with a reference numeral, of the plurality of collimator lenses.

Figure 14:
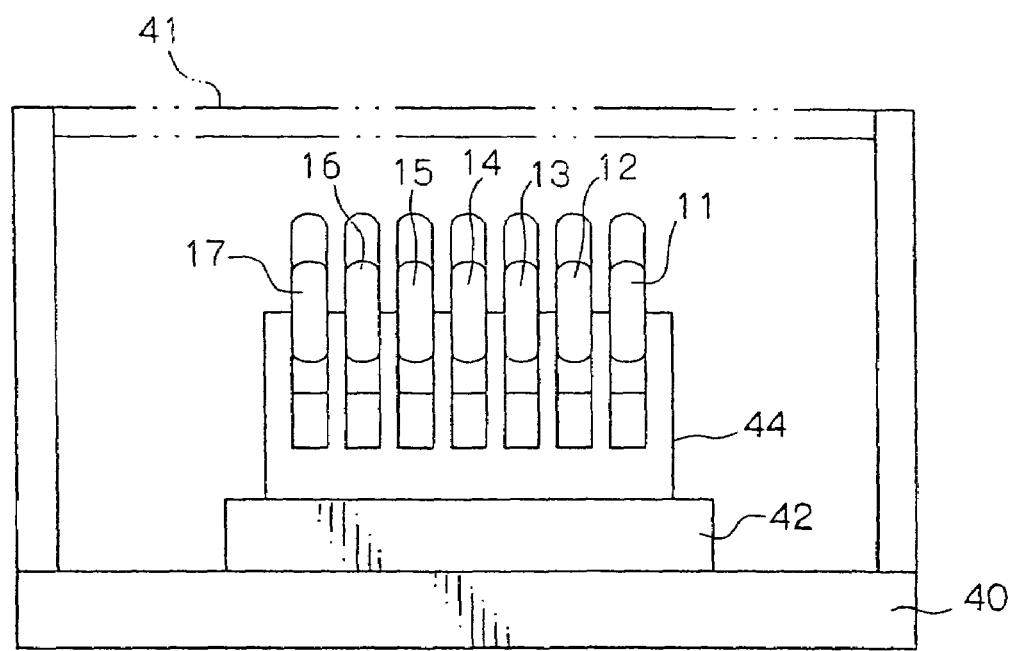
FIG. 14 is a partial elevational view showing structure of the laser module shown in FIG. 12.

FIG. 14 shows the collimator lenses 11 to 17 and mounting portions thereof, as viewed from front faces thereof.

Each of the collimator lenses 11 to 17 is formed in a long, narrow, cut-down shape with parallel flat faces (which shape would be obtained by cutting, with the parallel flat faces, a circular-form lens which is provided with an aspherical surface) defining a region that includes an optical axis of the circular-form lens. The collimator lenses with this long, narrow shape may be formed, for example, by molding-formation of resin or optical glass.

The collimator lenses 11 to 17 are closely disposed in a direction of arrangement of light emission points of the GaN-based semiconductor lasers LD1 to LD7 (the left-right direction in FIG. 14) such that the length directions of the collimator lenses 11 to 17 cross the direction of arrangement of the light emission points.

As the GaN-based semiconductor lasers LD1 to LD7, lasers may be employed which are provided with an active layer with a light emission width of 2 μm, and which emit respective laser beams B1 to B7 in forms which widen at angles of, for example, 10° and 30° with respect, respectively, to a direction parallel to the active layers and a direction perpendicular to the active layers. These GaN-based semiconductor lasers LD1 to LD7 are disposed such that the light emission points are lined up in a single row in the direction parallel to the active layers.

Accordingly, the laser beams B1 to B7 emitted from the respective light emission points are incident, respectively, on the collimator lenses 11 to 17 having the long, narrow forms described above, in states in which the direction for which the divergent angle of the beam is greater coincides with the length direction of the lens and the direction in which the divergent angle is smaller coincides with a width direction (a direction intersecting the length direction).

The condensing lens 20 is formed in a long, narrow, cut-down shape with parallel flat faces (which shape would be obtained by cutting, with the parallel flat faces, a circular-form lens which is provided with an aspherical surface) defining a region that includes an optical axis of the circular-form lens. The condensing lens 20 is also formed in a shape which is long in the direction of arrangement of the collimator lenses 11 to 17 (i.e., the horizontal direction) and short in a direction perpendicular thereto. A lens that has, for example, a focusing distance $f_2$=23 mm and NA=0.2 can be employed as the condensing lens 20. The condensing lens 20 is also formed by, for example, molding-formation of resin or optical glass.

Next, operation of the exposure device described above will be described.

At each of the exposure heads 166 of the scanner 162, the respective laser beams B1, B2, B3, B4, B5, B6 and B7, which are emitted in divergent forms from the respective GaN-based semiconductor lasers LD1 to LD7 that structure the multiplex laser light source of the fiber array light source 66, are converted to parallel light by the corresponding collimator lenses 11 to 17. The laser beams B1 to B7 that have been collimated are focused by the condensing lens 20, and converge at the incidence end face of a core 30a of the multi-mode optical fiber 30.

In the present embodiment, a condensing optical system is structured by the collimator lenses 11 to 17 and the condensing lens 20, and a multiplexing optical system is structured by the condensing optical system and the multi-mode optical fiber 30.

Thus, the laser beams B1 to B7 focused by the condensing lens 20 as described above enter the core 30a of the multi-mode optical fiber 30, are propagated in the optical fiber, multiplexed to a single laser beam B, and emitted from the optical fiber 31 coupled at the emission end portion of the multi-mode optical fiber 30.

At the laser emission portion 68 of the fiber array light source 66, high-luminance light emission points are arranged in a single row along the direction perpendicular to the scanning direction. Because a conventional fiber light source, in which laser light from a single semiconductor laser is focused at a single optical fiber, would have low output, a desired output could not be obtained without arranging these conventional light sources in a large number of rows. However, because the multiplex laser light sources employed in the present embodiment have high output, a desired output can be obtained with only a small number of rows, for example, one row.

Image data corresponding to an exposure pattern is inputted to an unillustrated controller which is connected to the DMDs 50, and is temporarily stored at a frame memory in the controller. This image data is data which represents a density of each pixel structuring an image with a binary value (whether or not a dot is to be recorded).

The stage 152, on whose surface the photosensitive material 150 has been adsorbed, is moved along the guides 158 at a constant speed by the unillustrated driving apparatus, from an upstream side of the gate 160 to a downstream side thereof.

When the stage 152 is passing under the gate 160, and the leading end of the photosensitive material 150 has been detected by the detection sensors 164 mounted at the gate 160, the image data stored in the frame memory is read out as a plurality of line portion units in sequence, and control signals for each of the exposure heads 166 are generated on the basis of the image data read from the data processing section. Hence, the micromirrors of the DMDs 50 at the respective exposure heads 166 are respectively switched on and off by the mirror driving control section on the basis of the control signals that have been generated.

When laser light is irradiated from the fiber array light sources 66 to the DMDs 50, if a micromirror of the DMD 50 is in the ON state, the reflected laser light is focused on the surface to be exposed 56 of the photosensitive material 150 by the lens systems 54 and 58. Thus, the laser light irradiated from the fiber array light source 66 is turned on or off at each pixel, and the photosensitive material 150 is exposed in a unit (the exposure area 168) with a number of pixels substantially the same as a number of pixels employed at the DMD 50.

In the present embodiment, because the DMD 50 is inclinedly disposed, the exposure area 168 is inclined at the predetermined inclination angle with respect to the scanning direction. Accordingly, the pitch of the scanning tracks (scanning lines) of the exposure beams 53 from the micromirrors is narrower than the pitch of scanning lines would be if the exposure area 168 were not inclined. Thus, the image can be recorded with higher resolution.

Furthermore, even in a case in which the actual inclination angle $\theta'$ of the DMD 50 varies from the ideal inclination angle $\theta$, because the number of pixels employed in the column direction is altered in accordance therewith, a variation of the pitch P in the direction perpendicular to the scanning direction can be suppressed.

Hence, as the photosensitive material 150 is moved together with the stage 152 at the constant speed, the photosensitive material 150 is scanned in a direction opposite to the stage movement direction by the scanner 162, and the strip-form exposed regions 170 are formed at the respective exposure heads 166.

When scanning of the photosensitive material 150 by the scanner 162 has been completed and the trailing end of the photosensitive material 150 has been detected by the detection sensors 164, the stage 152 is returned along the guides 158 by the unillustrated driving apparatus to a start point at an upstream-most side of the gate 160, and is again moved along the guides 158, at the constant speed, from the upstream side to the downstream side of the gate 160.

Now, in a structure that carries out multiple exposure such as the present embodiment, a wider area of the DMD 50 can be illuminated in comparison to a structure which does not perform multiple exposure. Therefore, it is possible to make a focusing depth of the exposure beams 53 longer.

For example, if the DMD 50 that was employed had a pitch of 15 µm and a length L=20 rows, a length of the DMD 50 corresponding to a single division region 178D (a length in the column direction) would be 15 µm×20=0.3 mm. Because the light would be irradiated at this narrow area by, for example, the lens system 67 shown in FIGS. 5A and 5B, it would be necessary to make a divergent angle of the flux of the laser light that illuminates the DMD 50 larger. Therefore, the focusing depth of the exposure beams 53 would be shorter.

In contrast, in the case in which a wider region of the DMD 50 is illuminated, the divergent angle of the flux of the laser light that is irradiated at the DMD 50 is smaller. Therefore, the focusing depth of the exposure beams 53 is longer.

In the above, an exposure head which is equipped with a DMD as a spatial light modulation element has been described. However, apart from such reflection-type spatial light modulation elements, transmission-type spatial light modulation elements (such as LCDs) may be employed.

For example, MEMS (microelectro-mechanical systems) type spatial light modulation elements (SLM: spatial light modulator) may be utilized. Alternatively, spatial light modulation elements other than MEMS types, such as optical elements which modulate transmitted light by electro-optical effects (e.g., PLZT elements) and liquid crystal shutter arrays such as liquid crystal shutters (FLC) may be utilized.

Here, MEMS is a general term for Microsystems in which micro-size sensors, actuators and control circuits are integrated by micro-machining technology based on IC production processes. MEMS type spatial light modulation elements means spatial light modulation elements which are driven by electro-mechanical operations by utilization of electrostatic forces.

Further, a spatial light modulation element which is structured to be two-dimensional by lining up a plurality of grating light valves (GLV) may be utilized. In structures which employ these reflection-type spatial light modulation elements (such as GLVs), transmission-type spatial light modulation elements (such as LCDs) and the like, apart from the lasers described above, lamps and the like may be employed as light sources.

For the embodiment described above, an example in which the fiber array light source that is utilized is equipped with a plurality of multiplex laser light sources has been described. However, the laser apparatus is not limited to a fiber array light source in which multiplexed laser light sources are arranged. For example, a fiber array light source may be utilized in which fiber light sources which are each equipped with a single optical fiber, which emits laser light inputted from a single semiconductor laser having one light emission point, are arrayed.

A light source in which a plurality of light emission points are two-dimensionally arranged (for example, a laser diode array, an organic electroluminescent array or the like) may be employed. With a structure which employs such a light source, each light emission point corresponds to a pixel. Hence, it is possible to omit the spatial light modulation devices mentioned above.

Figure 17:
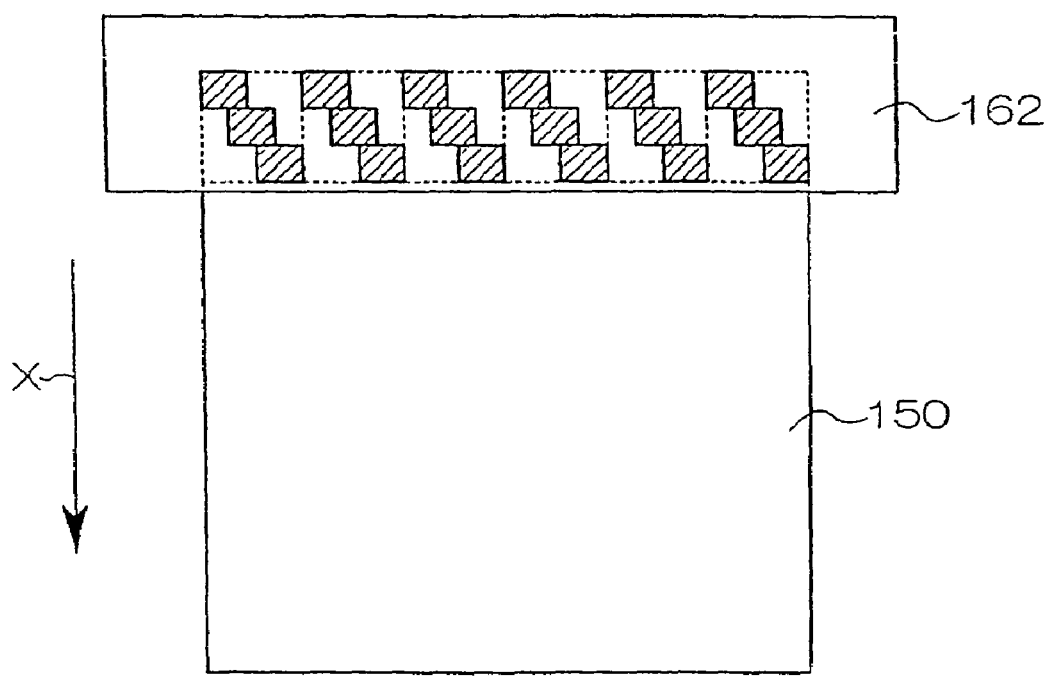
FIG. 17 is a plan view for explaining an exposure technique which exposes a photosensitive material with a single cycle of scanning by a scanner.
Figure 18A:
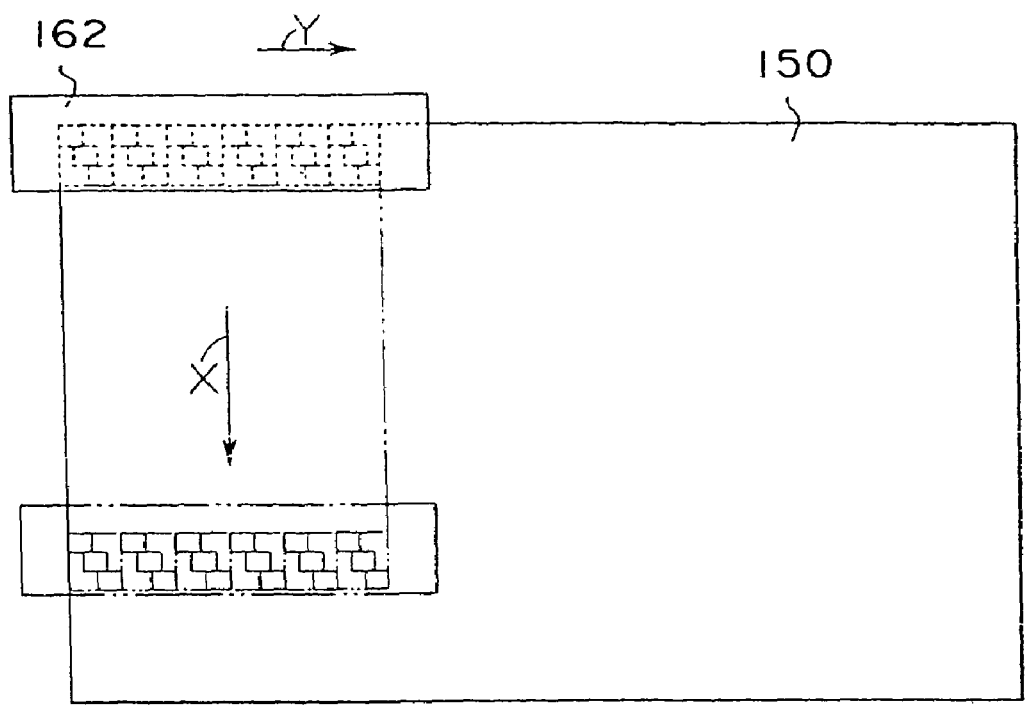
FIGS. 18A and 18B are plan views for explaining an exposure technique which exposes a photosensitive material with a plurality of cycles of scanning by a scanner.
Figure 18B:
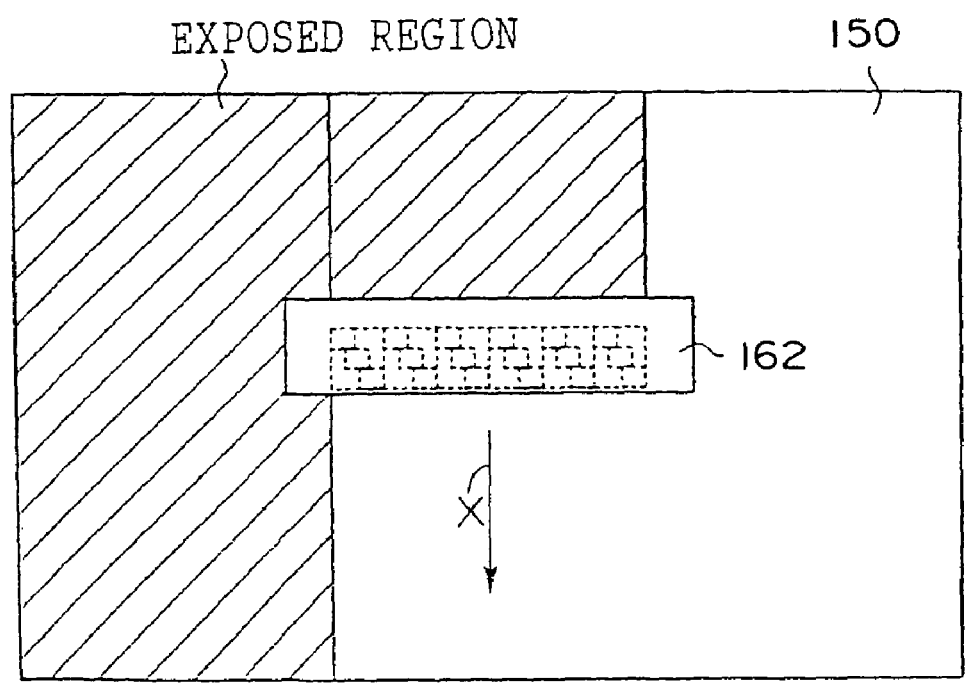

For the embodiment described above, an example has been described in which the whole surface of the photosensitive material 150 is exposed by a single cycle of scanning in a direction X by the scanner 162, as shown in FIG. 17. Alternatively, as shown in FIGS. 18A and 18B, a cycle of scanning and movement may be repeated such that, after the photosensitive material 150 has been scanned in the direction X by the scanner 162, the scanner 162 is moved one step in a direction Y and scanning is again carried out in the direction X. Thus, the whole surface of the photosensitive material 150 can be exposed by a plurality of cycles.

In the embodiment described above, a so-called flatbed-type exposure device has been offered as an example. However, an exposure device of the present invention may be a so-called outer drum-type exposure device which includes a drum, around which photosensitive material is wound.

The exposure apparatus described above may be suitably utilized for application to, for example, exposure of a dry film resist (DFR) in a process for producing a printed wiring board (PWB), formation of a color filter in a process for producing a liquid crystal display (LCD), exposure of a DFR in a process for producing a TFT, exposure of a DFR in a process for producing a plasma display panel (PDP), and the like.

With the exposure apparatus described above, any of photon mode photosensitive materials, which are directly recorded with information by exposure, and heat mode photosensitive materials, in which heat is generated by exposure and information is recorded thereby, may be employed.

In cases in which photon mode photosensitive materials are employed, GaN-based semiconductor lasers, wavelength-conversion solid state lasers or the like are employed at the laser apparatus, and in cases in which heat mode photosensitive materials are employed, AlGaAs-based semiconductor lasers (infrared lasers) or solid state lasers are employed at the laser apparatus.

Further still, the present invention is not limited to exposure devices, and can be employed in similar structures at, for example, inkjet recording heads.

Specifically, at an ordinary inkjet recording head, nozzles which eject ink droplets are formed in a nozzle face opposing a recording medium (for example, recording paper, an overhead projector sheet or the like). Among inkjet recording heads, there are inkjet recording heads in which these nozzles are plurally disposed in a checkerboard pattern, are inclined relative to a scanning direction of the head itself, and are capable of recording images with high resolution. With an inkjet recording head which employs such a two-dimensional arrangement, even if an actual inclination angle of the head itself varies from an ideal inclination angle, variations in pitch generated in recorded images can be suppressed to a certain range by application of the present invention.

In summary, the present invention, with a structure as described above, enables provision of high-resolution images that are free of unevenness without causing a rise in costs.

What is claimed is:

1. An imaging method which employs an imaging head which faces an imaging surface and is relatively moved along the imaging surface in a predetermined scanning direction for imaging, the imaging head comprising: an imaging element group including a plurality of imaging elements in a plane substantially parallel to the imaging surface, the imaging elements being two-dimensionally arranged, and the imaging element group generating a group of image pixels at the imaging surface in a two-dimensional arrangement which is inclined, as a whole, at a predetermined inclination angle with respect to the scanning direction; and an alteration section which, on the basis of a difference between the predetermined inclination angle of the imaging element group and an actual inclination angle of the image pixel group, alters a number of image pixels that are employed in a direction which is inclined from the scanning direction by the actual inclination angle, the method comprising the steps of:

(a) altering the number of image pixels that are employed in the direction which is inclined from the scanning direction by the actual inclination angle, so as to suppress variation of an image pitch in a direction perpendicular to the scanning direction, on the basis of the difference between the predetermined inclination angle of the imaging element group and the actual inclination angle of the image pixel group; and (b) employing the altered number of image pixels for imaging at the imaging surface.

2. The imaging method of claim 1, wherein the step of (a) altering the number of pixels employed comprises the step of:

(c) suppressing variation of an image pitch in the direction perpendicular to the scanning direction, to a certain range.

3. The imaging method of claim 2, wherein the step of (c) suppressing variation of the pitch to the certain range comprises the step of:

(d) increasing the number of pixels employed in the direction which is inclined by the actual inclination angle from the scanning direction, when the actual inclination angle is smaller than the predetermined inclination angle.

4. The imaging method of claim 3, wherein the step of (d) increasing the number of pixels employed comprises the step of: (e) increasing the number of pixels employed by one, when a difference between the predetermined inclination angle and the actual inclination angle exceeds a certain value.

5. The imaging method of claim 2, wherein the step of (c) suppressing variation of the pitch to the certain range comprises the step of:

(f) decreasing the number of pixels employed in the direction which is inclined by the actual inclination angle from the scanning direction, when the actual inclination angle is larger than the predetermined inclination angle.

6. The imaging method of claim 5, wherein the step of (f) decreasing the number of pixels employed comprises the step of: (g) decreasing the number of pixels employed by one, when a difference between the actual inclination angle and the predetermined inclination angle exceeds a certain value.

7. A method for producing a printed wiring board (PWB), comprising the steps of:

exposing a dry film resist (DFR) by employing the imaging method of claim 1; and producing a PWB by using the DFR thus obtained.

8. A method for producing a liquid crystal display (LCD), comprising the steps of:

forming a color filter by employing the imaging method of claim 1; and producing a LCD by using the color filter thus obtained.

9. A method for producing a thin film transistor (TFT), comprising the steps of:

exposing a dry film resist (DFR) by employing the imaging method of claim 1; and producing a TFT by using the DFR thus obtained.

10. A method for producing a plasma display panel (PDP), comprising the steps of:

exposing a dry film resist (DFR) by employing the imaging method of claim 1; and producing a PDP by using the DFR thus obtained.

11. An imaging head which faces an imaging surface and is moved relative to the imaging surface along the imaging surface in a predetermined scanning direction, the imaging head comprising:

an imaging element group, the imaging element group generating a group of image pixels at the imaging surface in a two-dimensional arrangement which is inclined, as a whole, at a predetermined inclination angle with respect to the scanning direction; and a setting/alteration section which, on the basis of an actual inclination angle of the image pixel group, sets or alters a number employed of image pixels in a direction which is inclined from the scanning direction by the actual inclination angle to control the variation of pitch of the image pixel group in a direction perpendicular to the scanning direction.

12. The imaging head of claim 11, wherein each pixel is aligned to form a pixel line in the direction which is inclined from the scanning direction by the actual inclination angle and the image pixel group includes a plurality of pixel lines in the direction which is inclined from the direction perpendicular to the scanning direction by the actual inclination angle.

13. The imaging head of claim 11, wherein the image pixels are aligned, as a whole, in a substantially rectangular shape.

14. The imaging head of claim 11, wherein the group of image pixels generated at the imaging surface is inclined, as a whole, at the predetermined inclination angle with respect to the scanning direction so as to maintain a predetermined pitch between the image pixels in the direction perpendicular to the scanning direction.

15. An image forming device comprising:

an imaging head which faces an imaging surface and is moved relative to the imaging surface along the imaging surface in a predetermined scanning direction; and a moving section which moves the imaging head relative to the imaging surface in a predetermined scanning direction, wherein the imaging head comprises:

an imaging element group generating a group of image pixels at the imaging surface in a two-dimensional arrangement which is inclined, as a whole, at a predetermined inclination angle with respect to the scanning direction; and a setting/alteration section which, on the basis of an actual inclination angle of the image pixel group, sets or alters a number employed of image pixels in a direction which is inclined from the scanning direction by the actual inclination angle to control the variation of pitch of the image pixel group in a direction perpendicular to the scanning direction.

16. The image forming device of claim 15, wherein each pixel is aligned to form a pixel line in the direction which is inclined from the scanning direction by the actual inclination angle and the image pixel group includes a plurality of pixel lines in the direction which is inclined from the direction perpendicular to the scanning direction by the actual inclination angle.

17. The image forming device of claim 15, wherein the image pixels are aligned, as a whole, in a substantially rectangular shape.

18. The image forming device of claim 15, wherein the group of image pixels generated at the imaging surface is inclined, as a whole, at the predetermined inclination angle with respect to the scanning direction so as to maintain a predetermined pitch between the image pixels in the direction perpendicular to the scanning direction.

19. An imaging element group adjustment method, the imaging element group being included in an imaging head and being adapted to move relative to an imaging surface in a scanning direction and generate a group of image pixels at the imaging surface in a two-dimensional arrangement which is inclined, as a whole, at a predetermined inclination angle with respect to the scanning direction, the method comprising:

setting or altering a number employed of image pixels in a direction which is inclined from the scanning direction by an actual inclination angle to control the variation of pitch of the image pixel group in a direction perpendicular to the scanning direction, on the basis of the actual inclination angle of the image pixel group.

20. The method of claim 19, wherein each pixel is aligned to form a pixel line in the direction which is inclined from the scanning direction by the actual inclination angle and the image pixel group includes a plurality of pixel lines in the direction which is inclined from the direction perpendicular to the scanning direction by the actual inclination angle.

21. The method of claim 19, wherein the image pixels are aligned, as a whole, in a substantially rectangular shape.

22. The method of claim 19, wherein the group of image pixels generated at the imaging surface is inclined, as a whole, at the predetermined inclination angle with respect to the scanning direction so as to maintain a predetermined pitch between the image pixels in the direction perpendicular to the scanning direction.

23. An imaging method comprising:

adjusting an imaging element group comprising the imaging element group being included in an imaging head and being adapted to move relative to an imaging surface in a scanning direction and generate a group of image pixels at the imaging surface in a two-dimensional arrangement which is inclined, as a whole, at a predetermined inclination angle with respect to the scanning direction, the method comprising:

setting or altering a number employed of image pixels in a direction which is inclined from the scanning direction by an actual inclination angle to control the variation of pitch of the image pixel group in a direction perpendicular to the scanning direction, on the basis of the actual inclination angle of the image pixel group;

moving the imaging head including the imaging element group in the scanning direction relative to the imaging surface; and forming an image on the imaging surface by the image pixel group.

24. The method of claim 23, wherein the image forming is any one selected from the group consisting of light-exposing a circuit pattern in a printed circuit board manufacturing process, light-exposing a color filter pattern in a liquid crystal display device manufacturing process, light-exposing a pattern in a thin film transistor manufacturing process, and light-exposing a pattern in a plasma display panel manufacturing process.

25. A device producing method comprising;
adjusting an imaging element group comprising the imaging element group being included in an imaging head and being adapted to move relative to an imaging surface in a scanning direction and generate a group of image pixels at the imaging surface in a two-dimensional arrangement which is inclined, as a whole, at a predetermined inclination angle with respect to the scanning direction, the method comprising:
  setting or altering a number employed of image pixels in a direction which is inclined from the scanning direction by an actual inclination angle to control the variation of pitch of the image pixel group in a direction perpendicular to the scanning direction, on the basis of the actual inclination angle of the image pixel group;
  moving the imaging head including the imaging element group in the scanning direction relative to the imaging surface;
  forming an image on the imaging surface by the image pixel group; and
  forming a pattern for the device by at least development exposure processing of the imaging surface.

26. The method of claim 25, wherein the device is one selected from the following group consisting of a printed circuit board, a liquid crystal display color filter, a thin film transistor, and a plasma display panel.

* * * * *